(12) United States Patent
Bielfelt

(10) Patent No.: US 8,371,657 B2
(45) Date of Patent: Feb. 12, 2013

(54) STORAGE HOPPER ASSEMBLY

(75) Inventor: Terry J. Bielfelt, Omaha, NE (US)

(73) Assignee: Timpte, Inc., David City, NE (US)

( * ) Notice: Subject to any disclaimer, the term of this patent is extended or adjusted under 35 U.S.C. 154(b) by 105 days.

(21) Appl. No.: 13/021,155

(22) Filed: Feb. 4, 2011

(65) Prior Publication Data

US 2011/0198911 A1 Aug. 18, 2011

Related U.S. Application Data

(60) Provisional application No. 61/303,929, filed on Feb. 12, 2010.

(51) Int. Cl.
*B60P 1/56* (2006.01)
*B61D 7/02* (2006.01)

(52) U.S. Cl. ......................................... 298/27

(58) Field of Classification Search ............ 298/24, 298/27; 414/548, 467; 105/239, 247, 248, 105/250, 280, 282.1
See application file for complete search history.

(56) References Cited

U.S. PATENT DOCUMENTS

| | | | |
|---|---|---|---|
| 3,100,457 A * | 8/1963 | Dorey .................. | 105/282.1 |
| 3,262,610 A | 7/1966 | Jordan | |
| 3,433,178 A | 3/1969 | Floehr | |
| 3,838,649 A * | 10/1974 | Barnard .................. | 105/240 |
| 3,917,084 A * | 11/1975 | Swisher et al. ............... | 414/523 |
| 4,298,306 A * | 11/1981 | Chaudorge ............... | 414/525.51 |
| 4,359,176 A * | 11/1982 | Johnson ........................ | 105/240 |
| 4,454,822 A * | 6/1984 | Fischer ......................... | 105/250 |
| 4,688,488 A * | 8/1987 | Adams et al. ................. | 105/253 |
| 5,086,709 A * | 2/1992 | Fischer et al. ............ | 105/282.1 |
| 5,402,731 A * | 4/1995 | Miller ........................... | 105/286 |
| 6,067,912 A * | 5/2000 | Miller ........................... | 105/283 |
| 6,085,948 A | 7/2000 | Putze | |
| 6,217,122 B1 * | 4/2001 | Kirbie ......................... | 298/17.5 |
| 6,416,133 B2 * | 7/2002 | Friesen ..................... | 298/35 M |
| 6,932,433 B2 * | 8/2005 | Heider et al. ................. | 298/27 |
| 7,059,683 B2 * | 6/2006 | Grier ............................ | 298/27 |
| 7,171,907 B2 * | 2/2007 | Early ........................... | 105/247 |
| 2001/0002766 A1 * | 6/2001 | Friesen ......................... | 298/27 |
| 2005/0168047 A1 * | 8/2005 | Grier ............................ | 298/27 |
| 2010/0270848 A1 * | 10/2010 | Heider et al. ................. | 298/27 |

* cited by examiner

*Primary Examiner* — H Gutman
(74) *Attorney, Agent, or Firm* — Suiter Swantz pc llo

(57) ABSTRACT

A transport assembly for transporting granular material may define at least a first egress for releasing a first portion of a granular material. The device may also include a door assembly slidably coupled with the transport assembly for at least substantially covering the first egress in a first position for retaining granular material and for at least substantially uncovering the first egress in a second position for controllably releasing the first portion of the granular material. The device may also include a linear actuator assembly coupled with the transport assembly and the door assembly for moving the door assembly between the first position and the second position. The device may also include a pump assembly coupled with the linear actuator assembly for actuating the linear actuator assembly to move the door assembly between the first position and the second position.

23 Claims, 26 Drawing Sheets

STORAGE HOPPER ASSEMBLY

CROSS-REFERENCE TO RELATED APPLICATIONS

The present application claims the benefit under 35 U.S.C. §119(e) of U.S. Provisional Application Ser. No. 61/303,929, filed Feb. 12, 2010, which is incorporated herein by reference.

TECHNICAL FIELD

The present disclosure generally relates to the field of material transport systems, and more particularly to a grain hopper assembly.

BACKGROUND

Storage hoppers are utilized for transporting various types of granular materials, including grains, animal feeds, crushed rock, coal, fertilizers, sand, salt, and other granular materials. Such storage hoppers include openings or apertures for releasing the granular materials. These apertures are generally closed with a trap door type mechanism. However, an operator may have to exert a great deal of effort to engage the release mechanism or device. For example, in some instances, storage hoppers may be filled with a large volume of material that exerts a great deal of weight on a door. Further, materials transported in such hoppers may themselves weigh a great deal, such as rock. Thus, opening a door to release these materials may require a great deal of effort on the part of an operator to overcome the friction generated by the weight of the material upon the door and its supporting structure. This difficulty may be compounded by adverse environmental conditions: oftentimes, an operator will deliver materials at night, as well as in all types of weather conditions, including cold weather, rain, snow, and the like.

In order to increase the ease with which an operator may open a door on a storage hopper, some types of doors have been provided with mechanisms designed to reduce the amount of friction on a door and/or to provide mechanical advantage for opening the door. Such doors may include various types of mechanisms, including rack and pinion mechanisms, flexible drive belt mechanisms, doors set on an inclined plane, and the like. However, such mechanisms may be exposed to wear and tear during the course of operation, both due to the forces on the mechanisms as well as the granular nature of the material being transported. For example, material may become lodged in a rack and pinion system and wear out the gearing over time. Further, with a flexible belt system, the belts may become stiff and/or may stretch over time, especially in cyclically changing weather conditions. Still further, doors set on an inclined plane may intrude into the space below a storage hopper, impeding material delivery.

Thus, it would be desirable to provide a door assembly for a storage hopper which did not intrude into a space below the hopper, which was particularly capable of opening and closing in various weather conditions and under various load conditions, which was capable of containing and releasing various types of materials, which provided different rates of discharge for the materials, and which was economical to manufacture.

SUMMARY

Accordingly, the present disclosure is directed to a device including a transport assembly for transporting granular material. The transport assembly may define a first egress, and possibly a second egress, for releasing a first portion of the granular material. Additionally, other egresses may be included as well. The device may also include a first door assembly slidably coupled with the transport assembly for controllably releasing the granular material. The first door assembly may be configured for at least substantially covering the first egress in a first position for retaining granular material. The first door assembly may be configured for at least substantially uncovering the first egress in a second position for controllably releasing the first portion of the granular material. The device may also include a linear actuator assembly coupled with the transport assembly and the first door assembly. The linear actuator assembly may be configured for moving the first door assembly between the first position and the second position. The device may also include a pump assembly coupled with the linear actuator assembly. The pump assembly may be configured for actuating the linear actuator assembly to move the door assembly between the first position and the second position. The device may include a selector valve connected between the pump assembly and the linear actuator assembly.

In some embodiments, the device may include a pump assembly coupled with the first linear actuator assembly and a second linear actuator assembly. The pump assembly may be configured for actuating the first linear actuator assembly to move the first door assembly and a second door assembly. The device may further include a selector valve connected between the pump assembly and the first linear actuator assembly and between the pump assembly and the second linear actuator assembly. The selector valve may be configured for selecting at least one of the first linear actuator assembly or the second linear actuator assembly and controlling the movement of at least one of the first door assembly or the second door assembly.

In other embodiments, the device may include a first selector valve connected between the pump assembly and the first linear actuator assembly. The device may also include a second selector valve connected between the pump assembly and the second linear actuator assembly. The second selector valve may be configured for controlling the movement of the second door assembly.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
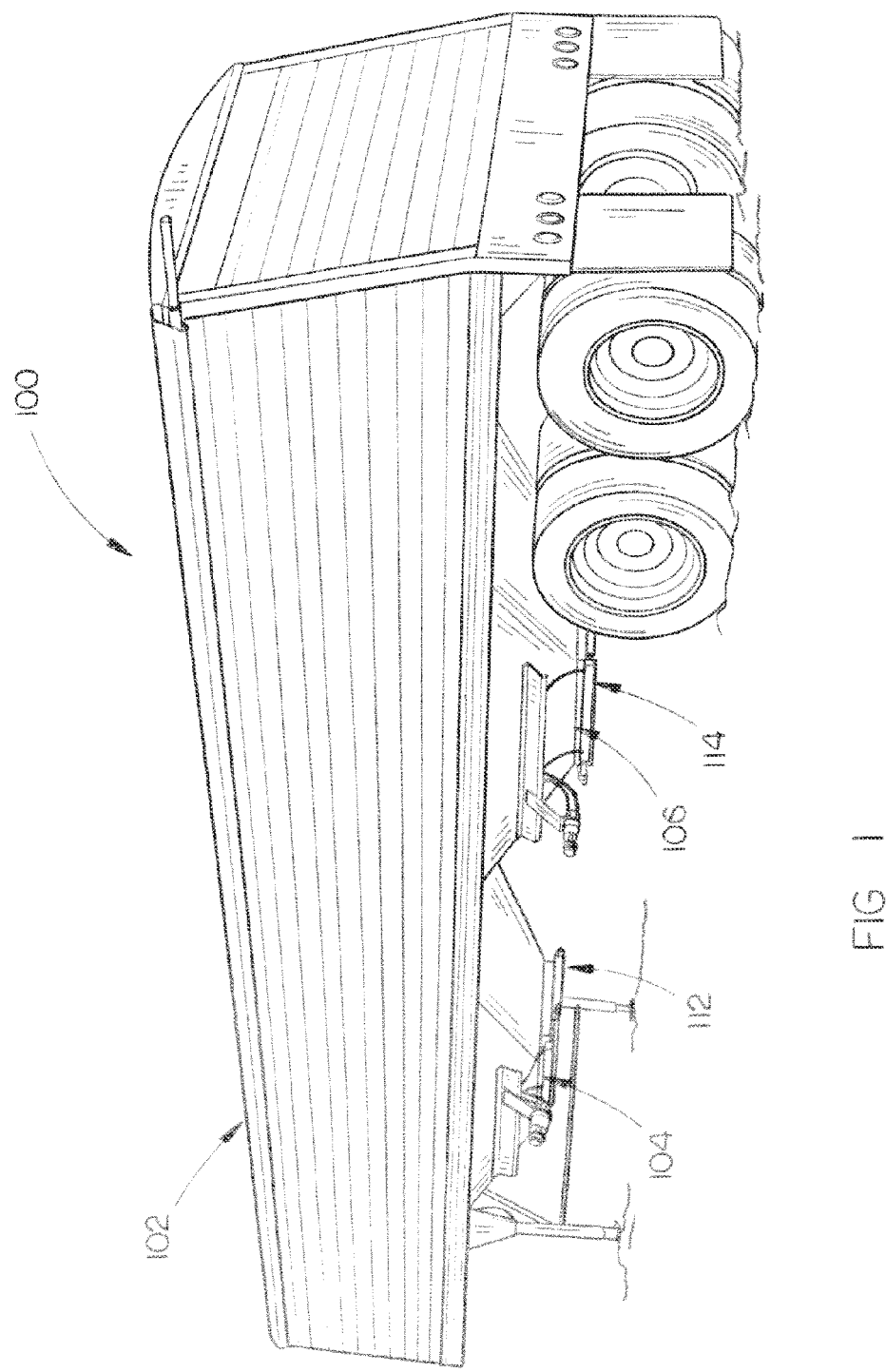
FIG. 1 is a perspective view illustrating a transport assembly for transporting granular material, including a first door assembly and a second door assembly for releasing the granular material.

Reference will now be made in detail to the subject matter disclosed, which is illustrated in the accompanying drawings.

Referring generally to FIGS. 1 through 23, a device 100 is described in accordance with the present disclosure. The device 100 may include a transport assembly 102 for holding granular materials (e.g. grain, wheat, or the like). The transport assembly may be a tractor-trailer or the like. The transport assembly 102 may define at least a first egress 104 (opening or aperture) and a second egress 106 (opening or aperture). The first egress 104 may be configured for releasing a portion of the granular material. The second egress 106 may be configured for releasing another portion of the granular material. While the first egress 104 and the second egress 106 are depicted as defined on the bottom side of the transport assembly 102 (bottom side being closest to the ground), it is contemplated that the first egress 104 and/or the second egress 106 may be defined at other locations on the transport assembly. For example, the first egress 104 and/or the second egress 106 may be defined on a side of the transport assembly 102 (e.g., a side adjacent to the bottom side). Further, while the first egress 104 and the second egress 106 are shown in the accompanying figures, it will be appreciated that one or more than two egresses may also be provided with the transport assembly 102, including three egresses, four egresses, six egresses, and the like.

The device 100 may include a first door assembly 108 slidably coupled with the transport assembly 102 via a ball bearing assembly 150, track assembly, or the like. The first door assembly 108 may be configured for at least substantially covering the first egress 104 in a position for retaining granular material. The first door assembly 108 may be configured for at least substantially uncovering the first egress 104 in a different position for controllably releasing the first portion of the granular material. The device 100 may include a second door assembly 110 slidably coupled with the transport assembly 102 via a ball bearing assembly 150, track assembly, or the like. The second door assembly 110 may be configured for at least substantially covering the second egress 106 in a position for retaining granular material. The second door assembly 110 may be configured for at least substantially uncovering the second egress 106 in a different position for controllably releasing another portion of the granular material.

The device 100 may include a first linear actuator assembly (e.g., a pump-driven linear actuator such as a pneumatic assembly or a hydraulic assembly 112) coupled with the transport assembly 102 and the first door assembly 108 via a flange assembly 144 and/or fasteners 192 (e.g. screws, bolts, rivets). The first hydraulic assembly 112 may be configured for moving the first door assembly 108 between a position for retaining the granular material and a position for releasing a portion of the granular material. The device 100 may include a second linear actuator assembly (e.g., a pneumatic assembly or a hydraulic assembly 114) coupled with the transport assembly 102 and the second door assembly 110 via a flange assembly 144 and/or fasteners 192 (e.g. screws, bolts, rivets). The second hydraulic assembly 114 may be configured for moving the second door assembly 110 between a position for retaining the granular material and a position for releasing a portion of the granular material. In embodiments, the first hydraulic assembly and/or the second hydraulic assembly may be implemented as a hydraulic linear motor, such as a mechanical actuator that gives a unidirectional force through a unidirectional stroke. However, other types of equipment utilizing pressurized hydraulic fluid may be utilized as well. Further, while the flange assemblies 144 and the fasteners 192 have been described with some specificity, it will be appreciated that the hydraulic assembly may be connected to the transport assembly 102 and/or the first and second door assemblies 108 and 110 utilizing a variety of other hardware and fasteners.

The device 100 may include a variety of one or more pump assemblies. The pump assemblies may include a pump assembly 116, a pump assembly 120, a pump assembly 122, a pump assembly 124, a pump assembly 126, and/or a pump assembly 128. A pump assembly may be coupled with the first hydraulic assembly 112 via hoses 142. A pump assembly may also be coupled with the second hydraulic assembly 114 via hoses 142. The one or more pump assemblies may be configured for actuating/activating the first hydraulic assembly 112 to move the first door assembly 108 between a position for retaining the granular material and a position for releasing a portion of the granular material. The one or more pump assemblies may be configured for actuating the second hydraulic assembly 114 to move the second door assembly 108 between a position for retaining the granular material and a position for releasing the granular material. In some embodiments, the hoses 142 may be constructed from stainless steel tubing, while in other embodiments, the hoses 142 may be constructed from braided stainless steel tubing. However, these implementations are provided by way of example only, and it will be appreciated that other types of tubing and hoses may be utilized to connect the hydraulic components. In embodiments, the one or more pump assemblies and one or more hydraulic assemblies may be configured to utilize biodegradable hydraulic fluid (e.g., hydraulic fluid formulated from natural seed oils).

Figure 2:
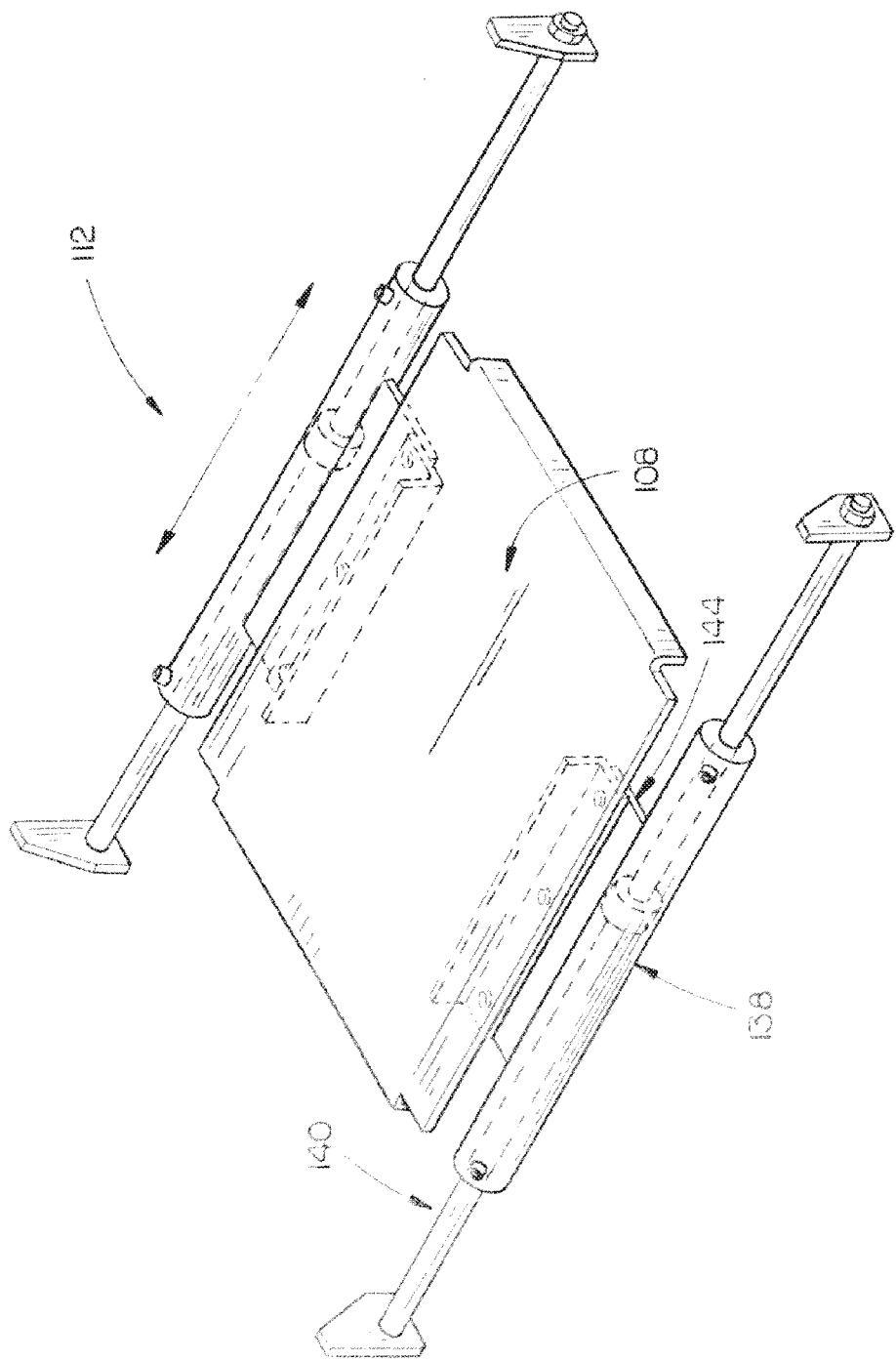
FIG. 2 is an isometric view illustrating a hydraulic assembly and a door assembly for a transport assembly, where the door assembly is coupled with hydraulic cylinders.
Figure 3:
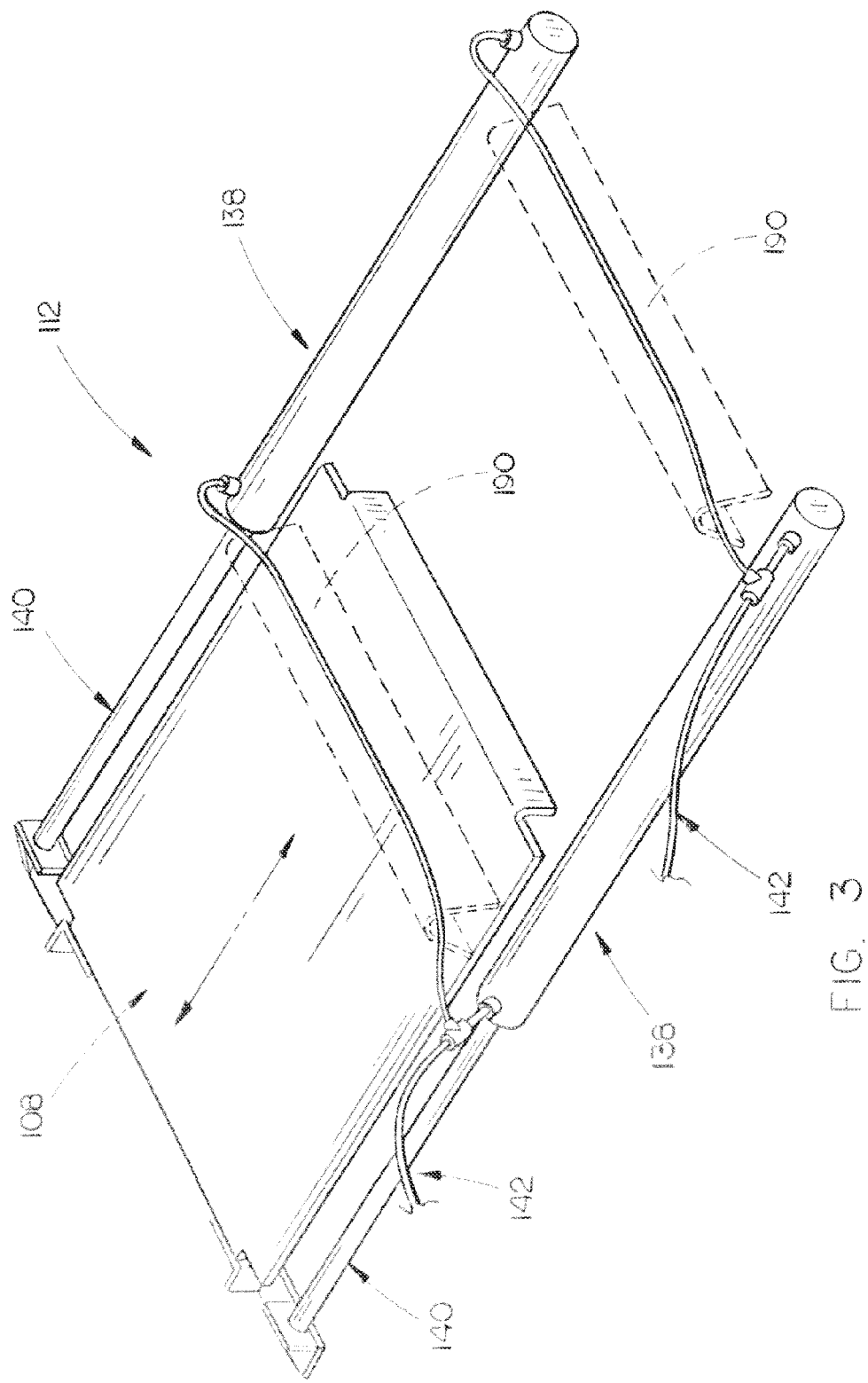
FIG. 3 is an isometric view illustrating a hydraulic assembly and a door assembly for a transport assembly, where the door assembly is coupled with hydraulic cylinder rods.
Figure 4:
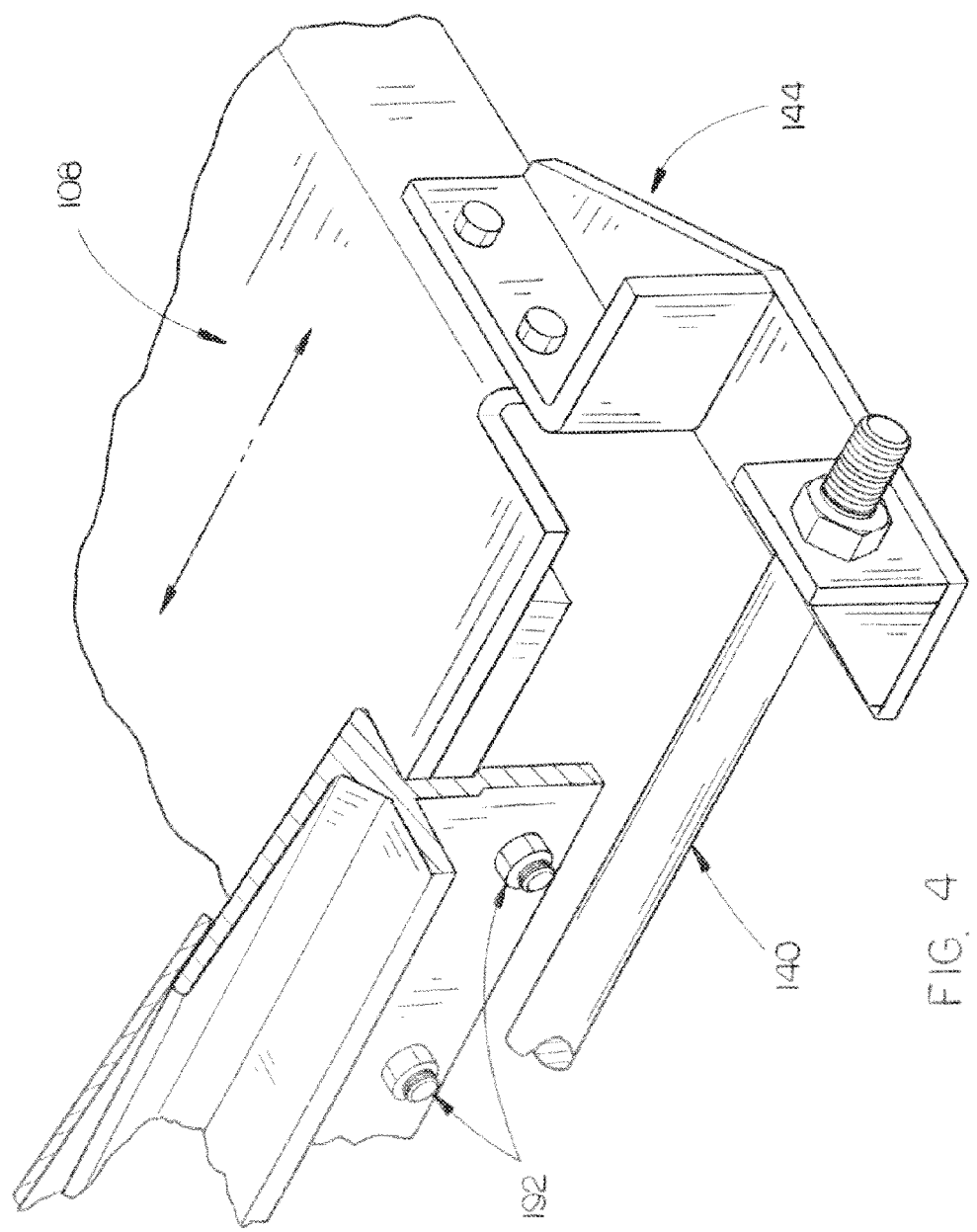
FIG. 4 is a partial cross sectional isometric view of the hydraulic assembly and the door assembly illustrated in FIG. 3.

Referring now to FIGS. 3 through 7, the first hydraulic assembly 112 may include two or more cylinders 138; two or more cylinder rods 140, where each cylinder rod 140 is enclosed by a cylinder 138; and hoses 142 for transporting hydraulic fluid from a pump assembly to the first hydraulic assembly 112 and from the first hydraulic assembly 112 to the pump assembly. In some embodiments, the first door assembly 108 may be fastened to the cylinder rods 140 of the first hydraulic assembly 112 (e.g., utilizing a flange assembly 144). Alternatively, the first door assembly 108 may be fastened to the cylinders 138 of the first hydraulic assembly 112 (e.g., utilizing a flange assembly 144, as illustrated in FIG. 2). The fastening devices may include screws, bolts, rivets, and the like.

The pump assembly or pump assemblies may pump or displace hydraulic fluid to the one or more hydraulic assemblies 112. The hydraulic fluid may enter a cylinder 138 via a hose 142. The hydraulic fluid may then force the cylinder rod 140 to extend or retract, which then may extend or retract the first door assembly 108 coupled to the cylinder rods 140. Thus, the first hydraulic assembly 112 extends or retracts the first door assembly 108 in a plane generally parallel with the first hydraulic assembly 112. Hydraulic fluid may be displaced from a cylinder 138 to the pump assembly via the hoses 142. Any excess hydraulic fluid not stored in the pump assembly or a hydraulic cylinder may be stored in a reservoir 196. In some embodiments, the reservoir may be constructed from a clear and/or semi-transparent material for allowing an operator to easily view how much hydraulic fluid is in the reservoir.

The first door assembly 108 may be supported by a bearing assembly 150 to reduce friction when the first hydraulic assembly 112 extends or retracts the first door assembly 108. While FIGS. 3 through 7 depict the first hydraulic assembly 112, it is contemplated that the second hydraulic assembly 114 and/or the second door assembly 110 may also be arranged in the manner illustrated in FIGS. 3 through 7. In embodiments, the first door assembly 108 and/or the second door assembly 110 may be attached to the hydraulic cylinders 138 and/or the cylinder rods 140 so that the cylinder rods 140 are retracted when a corresponding door assembly is oriented in a closed position. This type of configuration may be utilized to shield the cylinder rods 140 from debris, corrosion, and/or other environmental factors, especially while the transport assembly is 102 is travelling to transport the granular material. Alternatively, the cylinder rods 140 may be configured in an extended position when a corresponding door assembly is oriented in a closed position.

The cylinders 138 may be industrial hydraulic cylinders, or the like. In one specific embodiment, the hydraulic cylinders may be one-inch bore, 31-inch stroke, ⅝-inch rod diameter ag tub cylinders. In another specific embodiment, the hydraulic cylinders may be one-inch bore, 39-inch stroke, ⅝-inch rod diameter split tub cylinders. In embodiments, the cylinder rods may be constructed from a corrosion and/or chip resistant material, such as steel having an oxygen-enriched iron nitride layer at the surface of the steel with a nitrogen-hardened zone underneath. For example the cylinder rods 140 may be NitroSteel® rods; however, it is contemplated that other types of cylinder rods fabricated from other types of materials may be utilized with the present disclosure.

Figure 5:
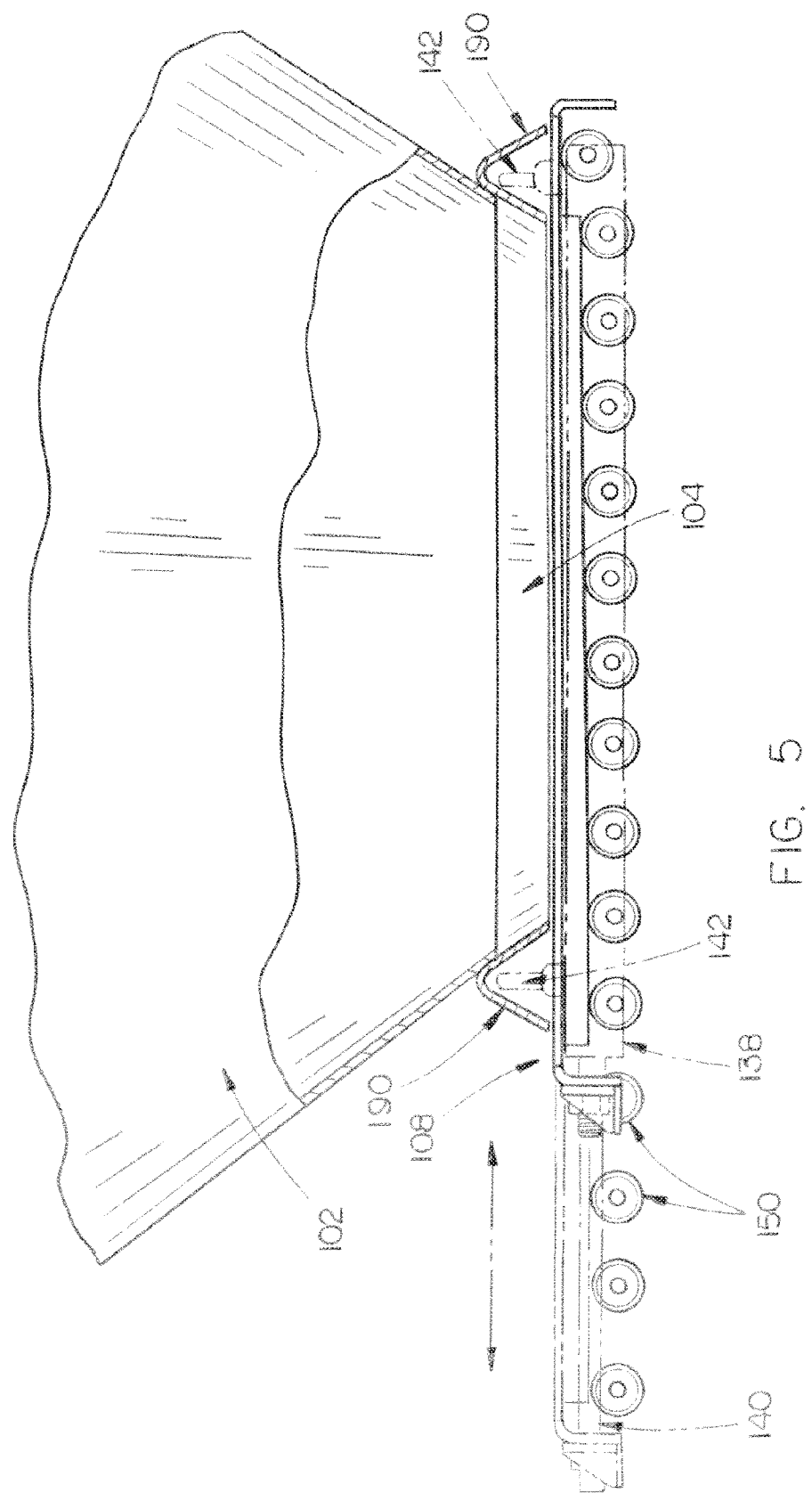
FIG. 5 is a partial side elevation view of the hydraulic assembly and the door assembly illustrated in FIG. 3, where the door assembly is supported below a transport assembly utilizing a ball bearing assembly for translating between a closed position for retaining granular material and an opened position for releasing granular material.
Figure 6:
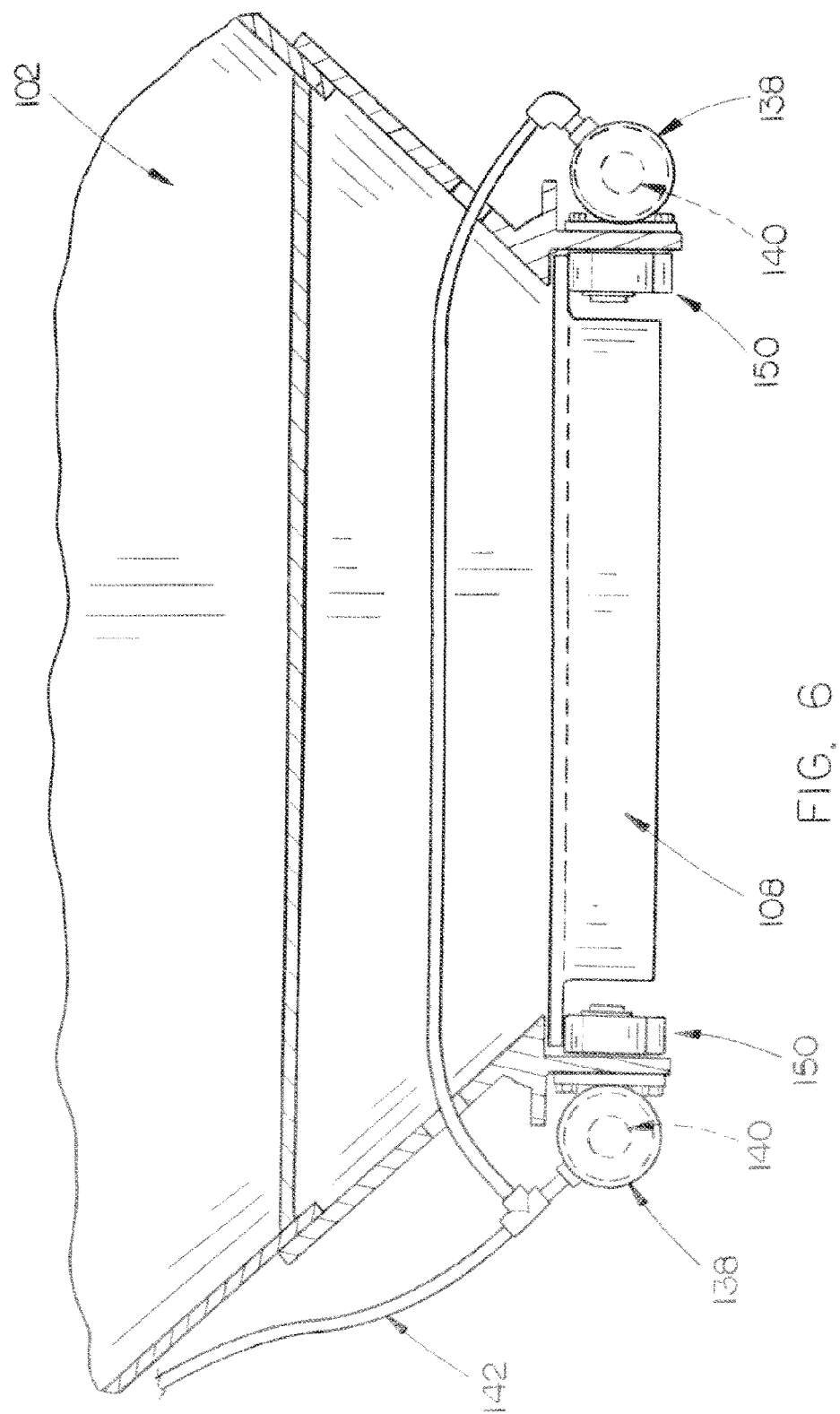
FIG. 6 is a partial end elevation view of the transport assembly, the hydraulic assembly, the door assembly, and the ball bearing assembly illustrated in FIG. 5.
Figure 7:
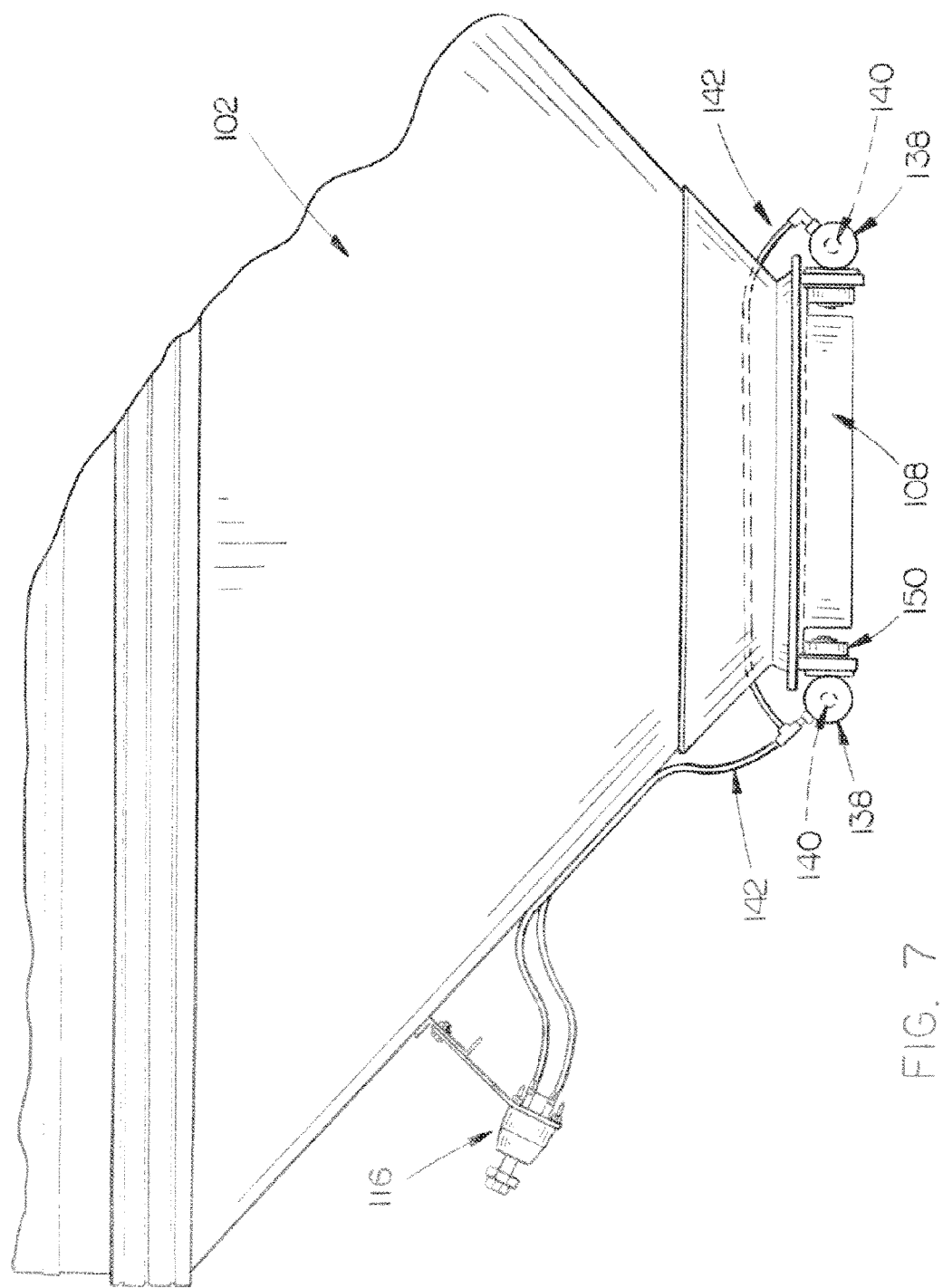
FIG. 7 is a partial end elevation view of the transport assembly, the hydraulic assembly, the door assembly, and the ball bearing assembly illustrated in FIG. 5, and further including a pump assembly for opening and closing the door assembly.
Figure 8A:
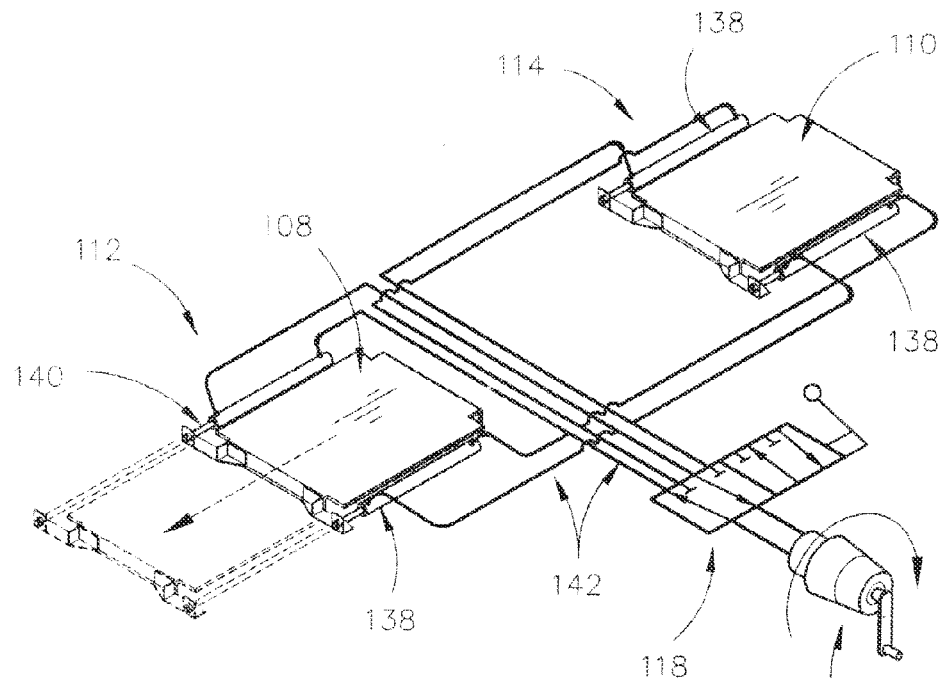
FIGS. 8A through 8D are schematics illustrating a first door assembly coupled with a first hydraulic assembly, a second door assembly coupled with a second hydraulic assembly, a hand operable hydraulic pump for actuating the first and second hydraulic assemblies for opening and closing the first and second door assemblies, and a selector valve for selectively operating the first and second hydraulic assemblies for opening and closing the first and second door assemblies utilizing the hydraulic pump.
Figure 8B:
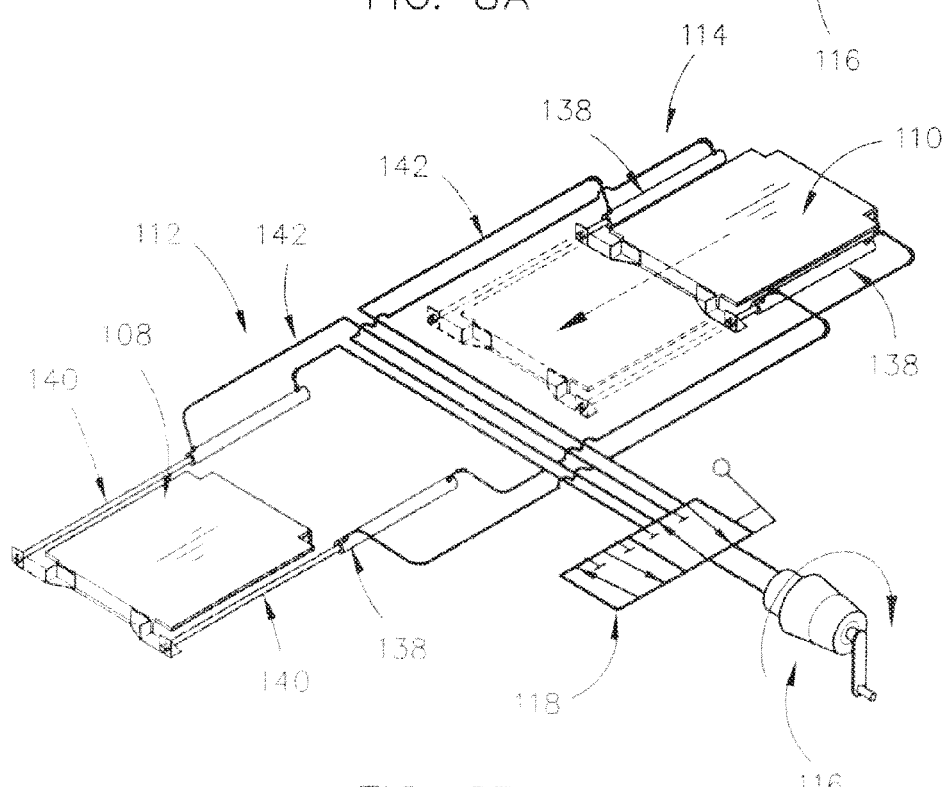
Figure 8C:
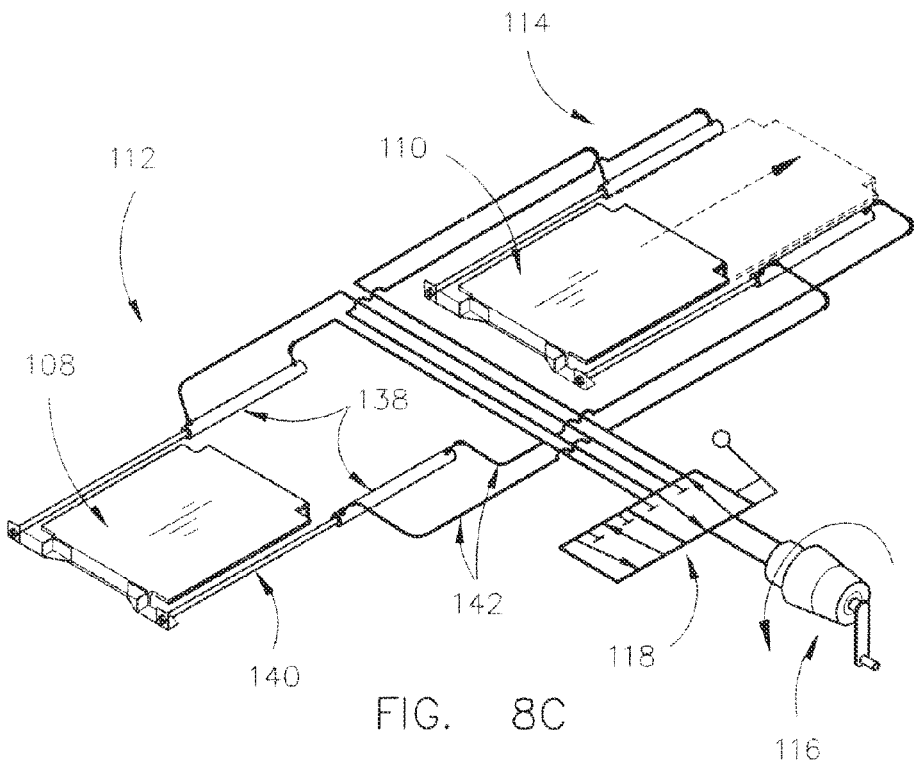
Figure 8D:
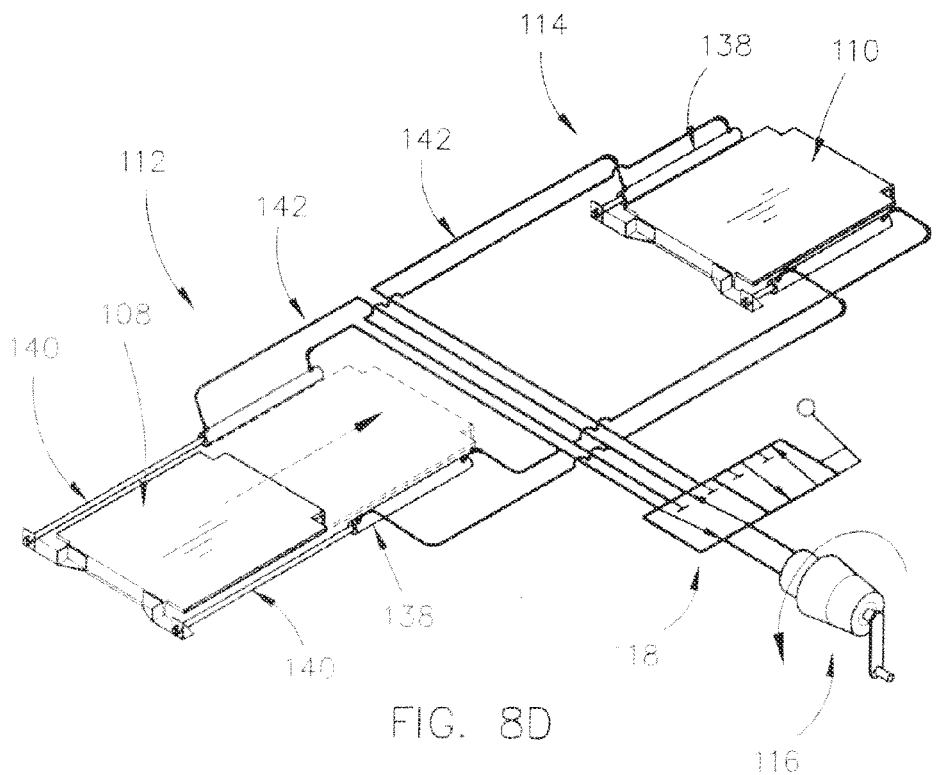

Referring generally to FIG. 5, one or more A-frame structures 190 may house the hoses 142 for convenience and/or aesthetic purposes. It should be noted that other variously shaped structures may be utilized to cover the hoses 142 as well.

Figure 9A:
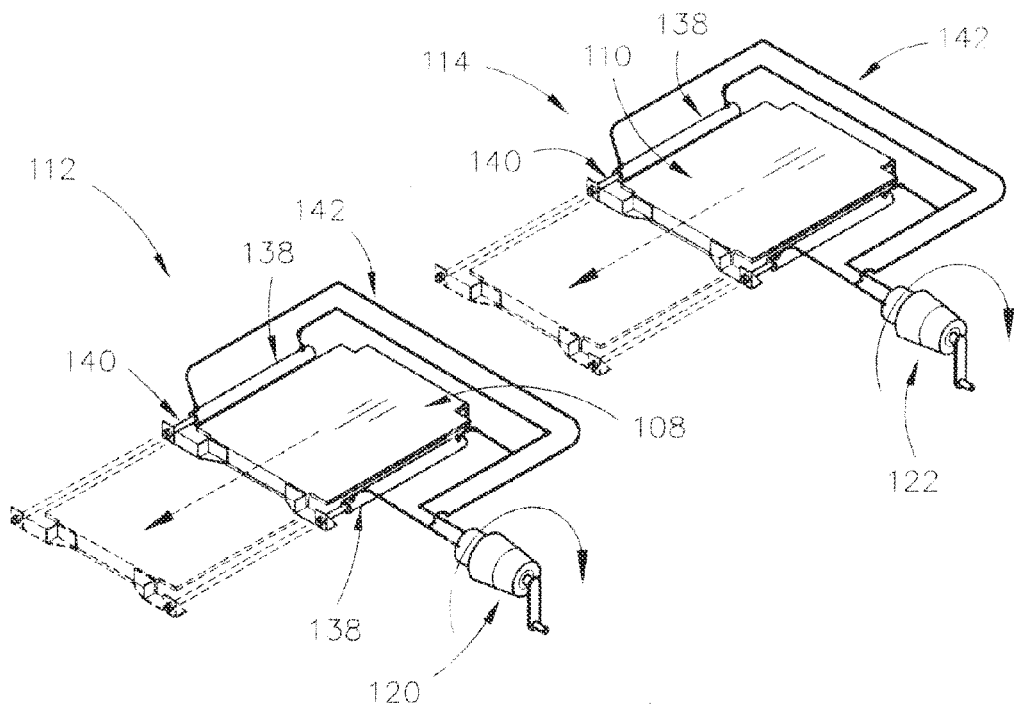
FIGS. 9A and 9B are schematics illustrating a first door assembly coupled with a first hydraulic assembly, a second door assembly coupled with a second hydraulic assembly, a first hand operable hydraulic pump for actuating the first hydraulic assembly for opening and closing the first door assembly, and a second hand operable hydraulic pump for actuating the second hydraulic assembly for opening and closing the second door assembly.
Figure 9B:
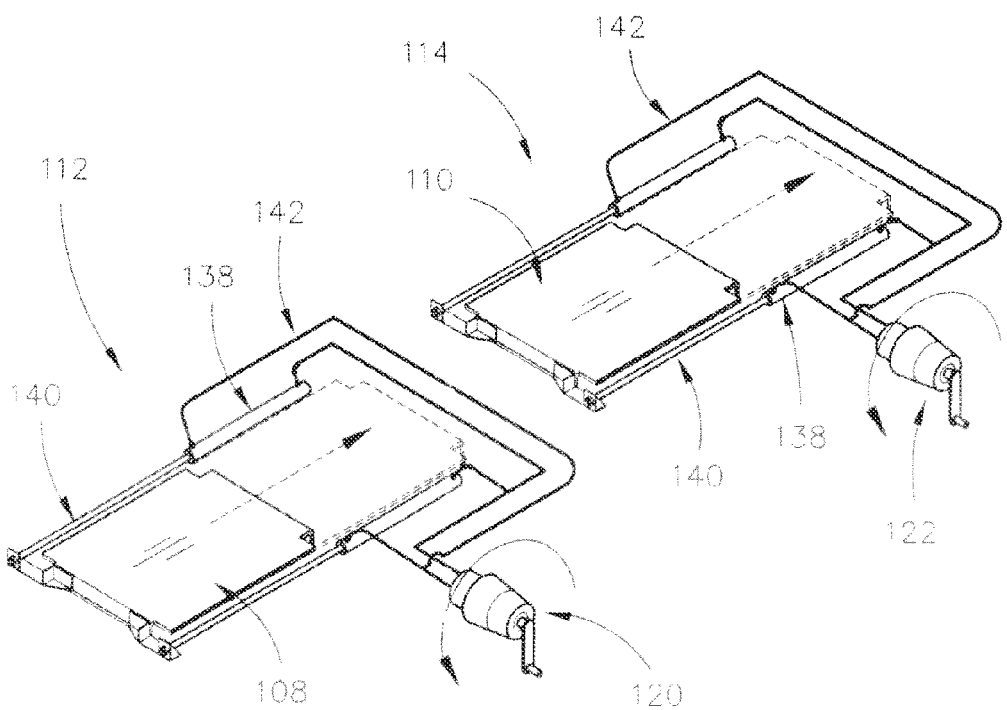
Figure 10A:
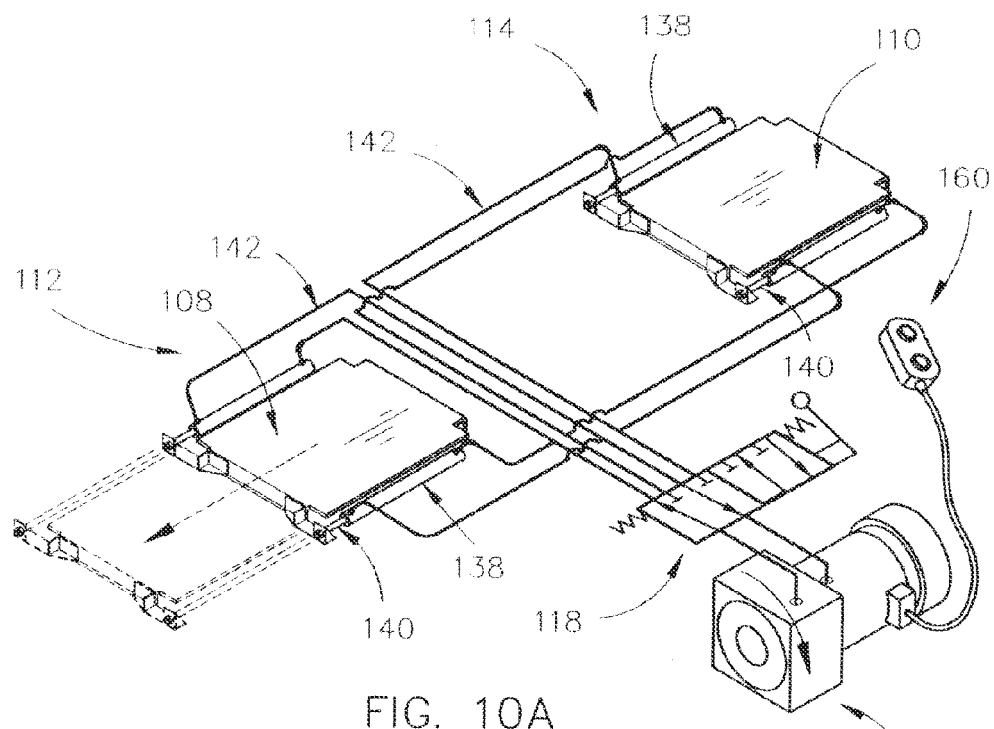
FIGS. 10A through 10D are schematics illustrating a first door assembly coupled with a first hydraulic assembly, a second door assembly coupled with a second hydraulic assembly, a motor driven hydraulic pump for actuating the first and second hydraulic assemblies for opening and closing the first and second door assemblies, and a selector valve for selectively operating the first and second hydraulic assemblies for opening and closing the first and second door assemblies utilizing the hydraulic pump.
Figure 10B:
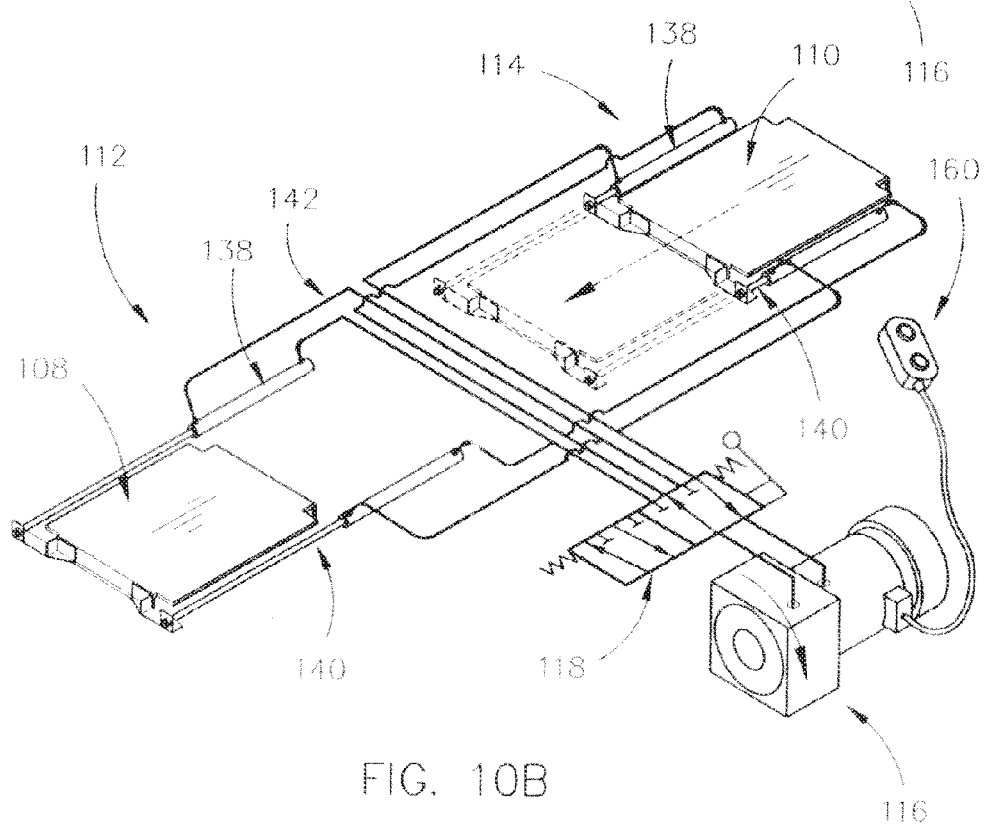
Figure 10C:
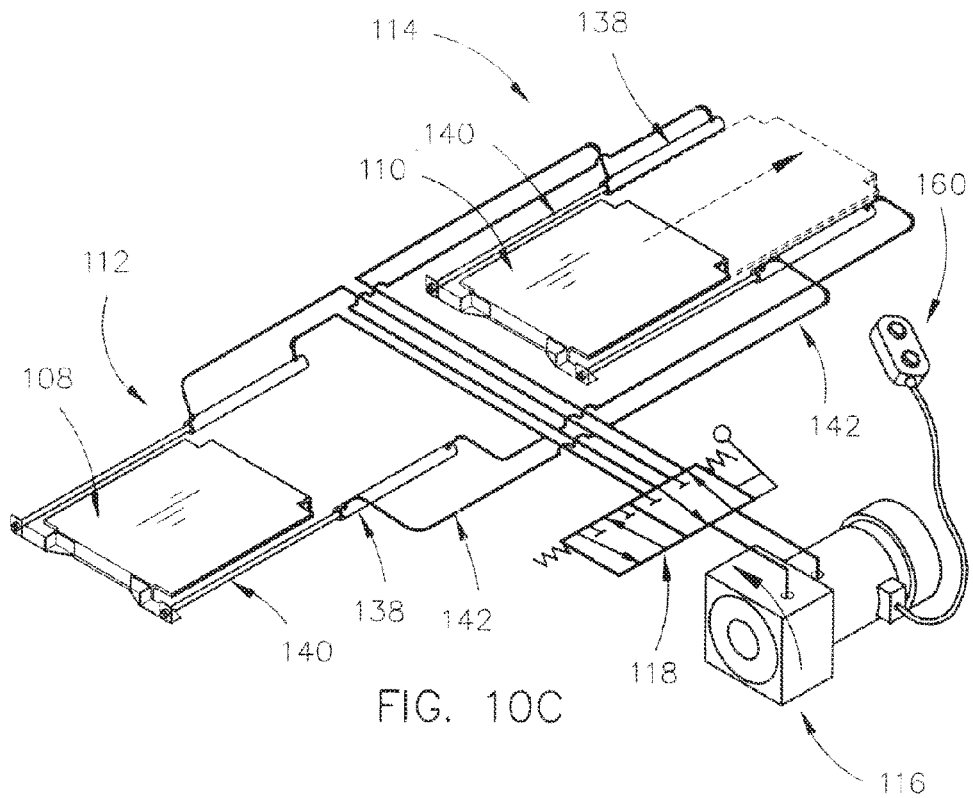
Figure 10D:
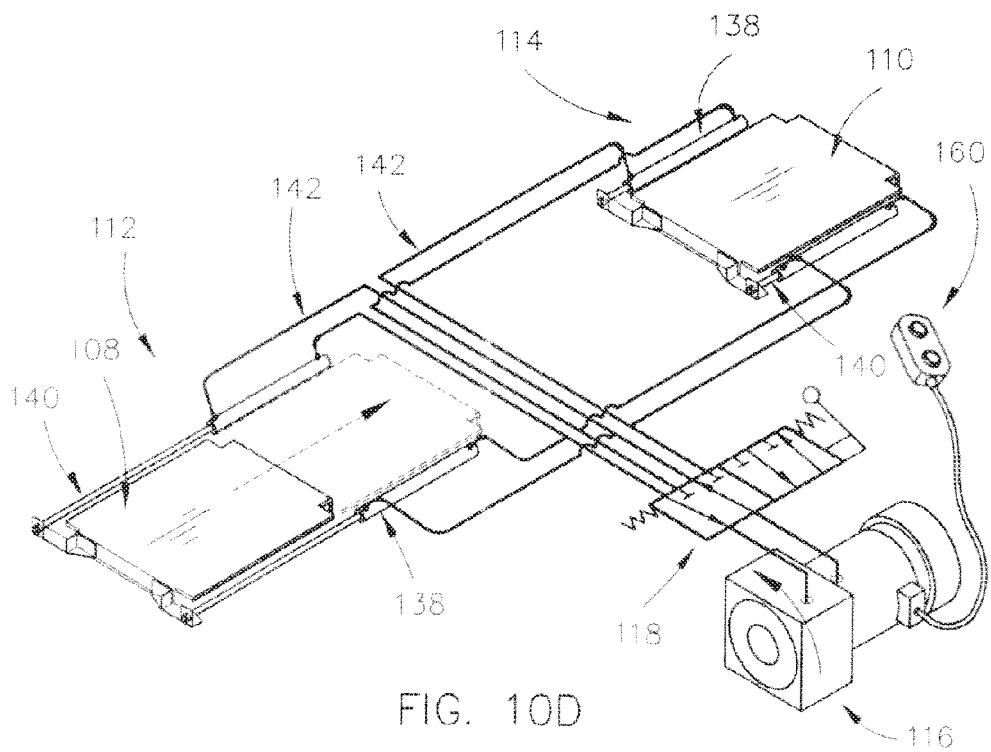
Figure 11A:
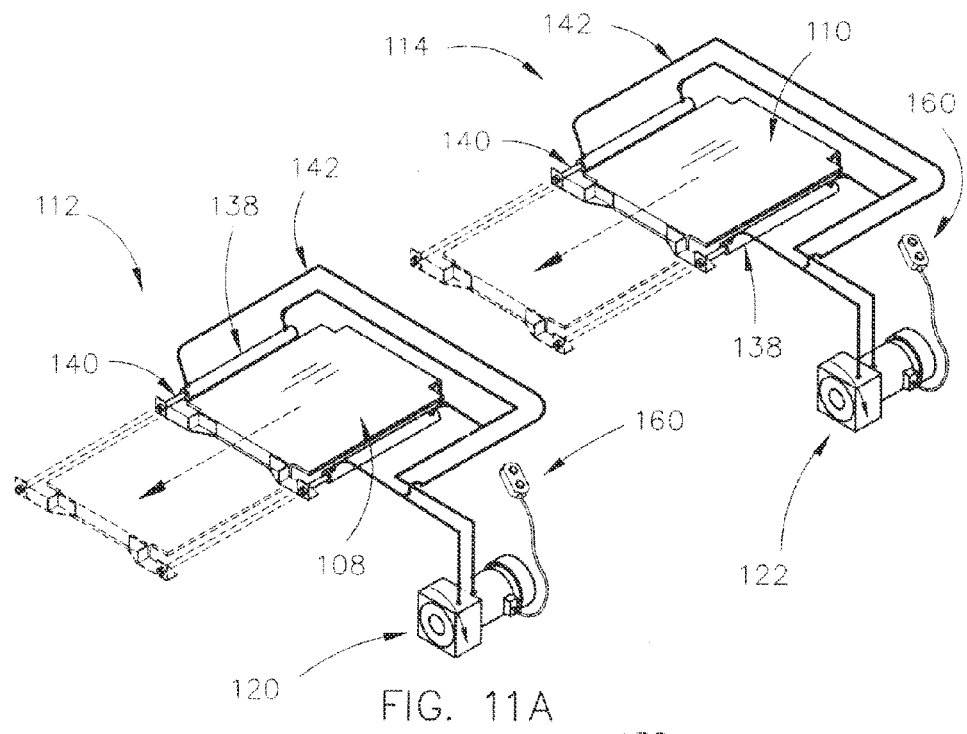
FIGS. 11A and 11B are schematics illustrating a first door assembly coupled with a first hydraulic assembly, a second door assembly coupled with a second hydraulic assembly, a first motor driven hydraulic pump for actuating the first hydraulic assembly for opening and closing the first door assembly, and a second motor driven hydraulic pump for actuating the second hydraulic assembly for opening and closing the second door assembly.
Figure 11B:
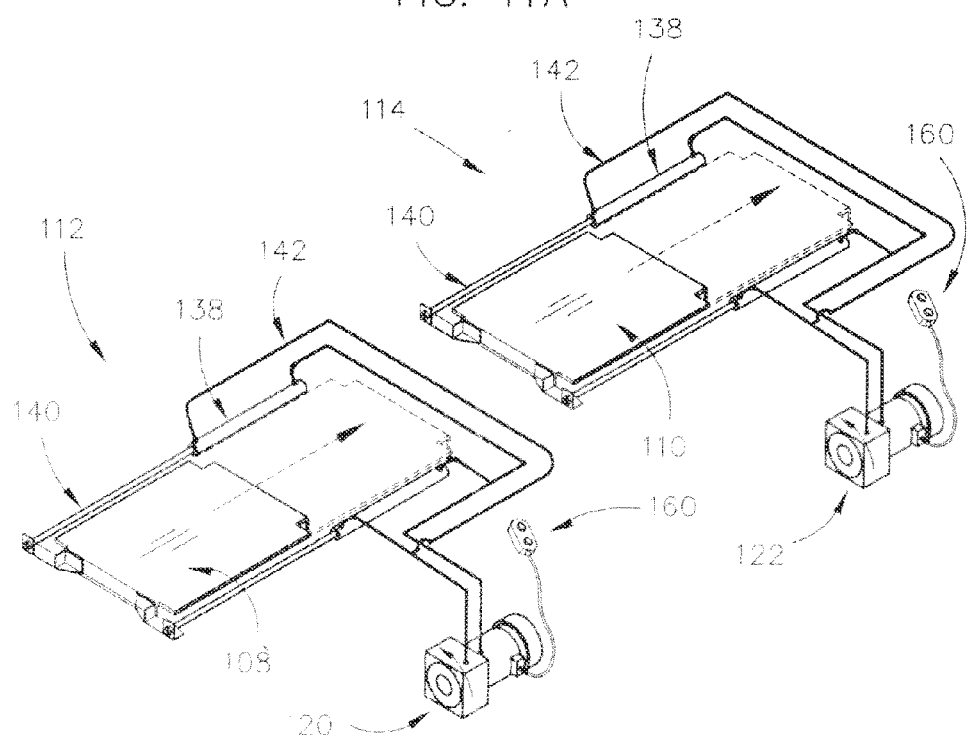
Figure 12A:
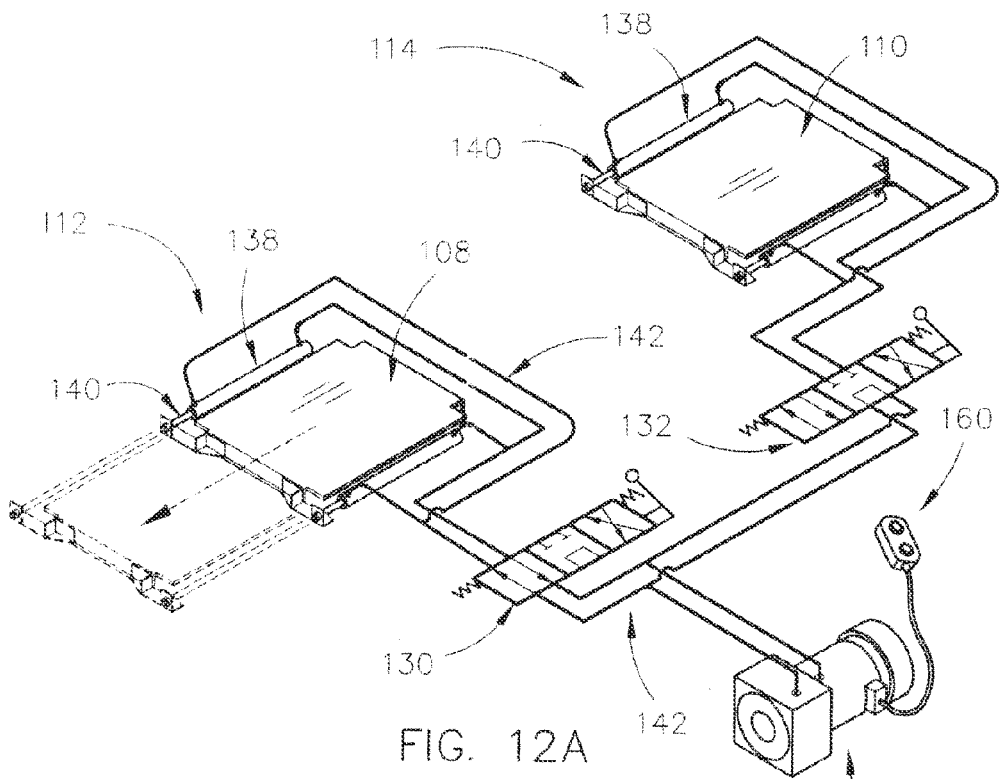
FIGS. 12A through 12D are schematics illustrating a first door assembly coupled with a first hydraulic assembly, a second door assembly coupled with a second hydraulic assembly, a motor driven hydraulic pump for actuating the first and second hydraulic assemblies for opening and closing the first and second door assemblies, a first selector valve for selectively operating the first hydraulic assembly for opening and closing the first door assembly utilizing the hydraulic pump, and a second selector valve for selectively operating the second hydraulic assembly for opening and closing the second door assembly utilizing the hydraulic pump.
Figure 12B:
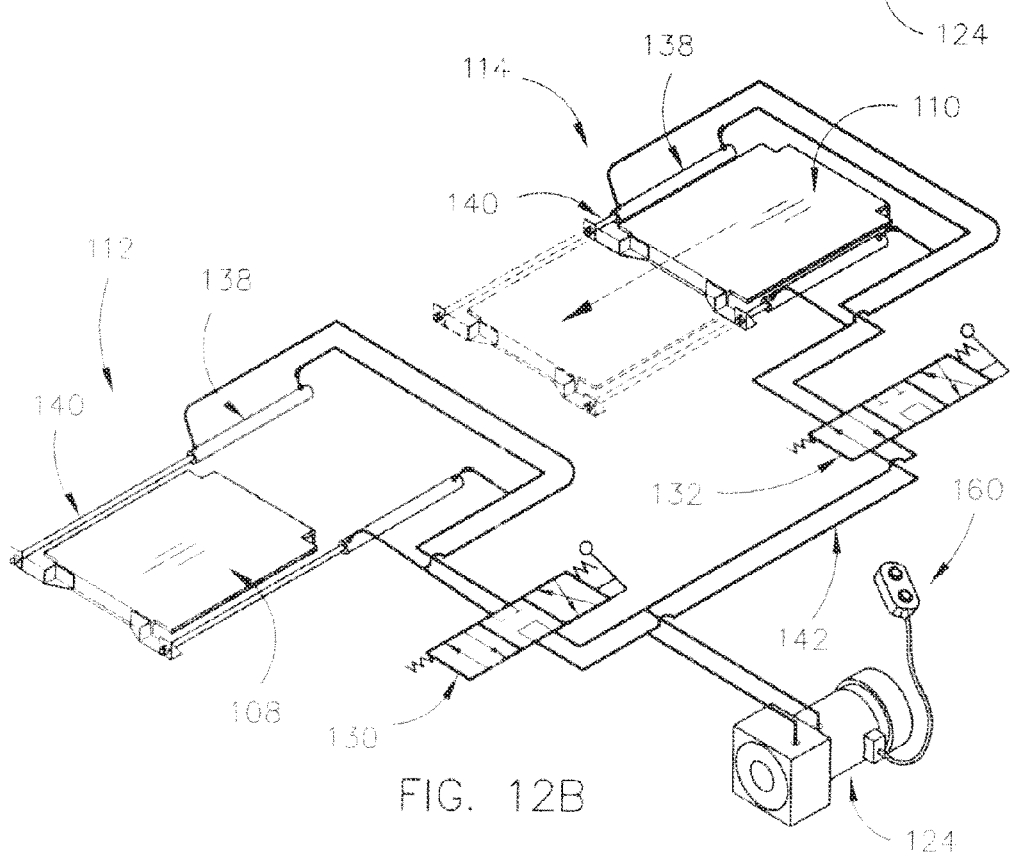
Figure 12C:
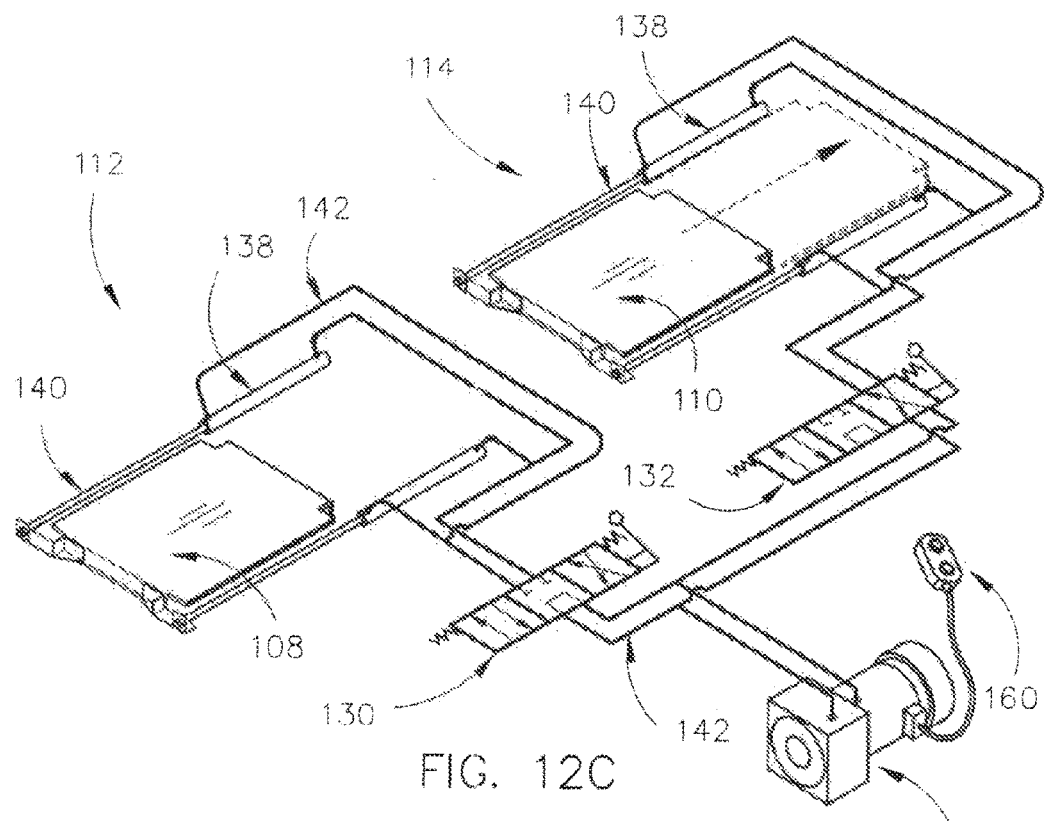
Figure 12D:
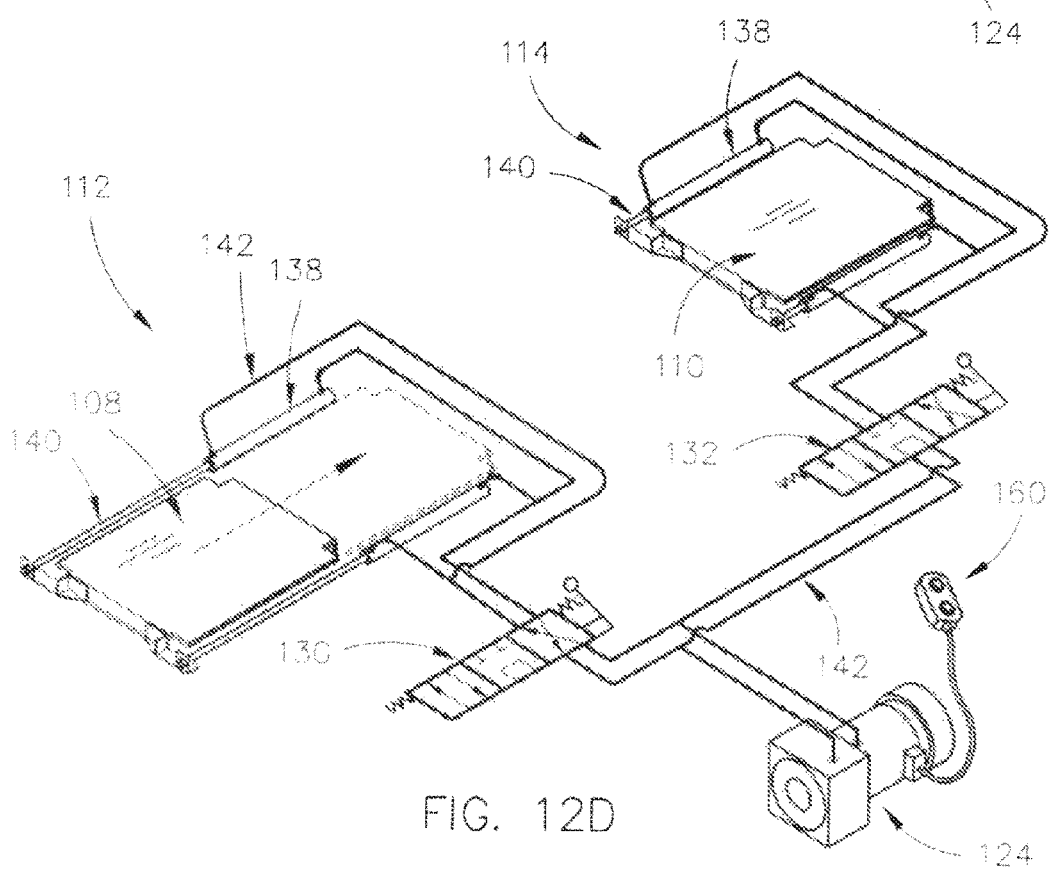
Figure 13A:
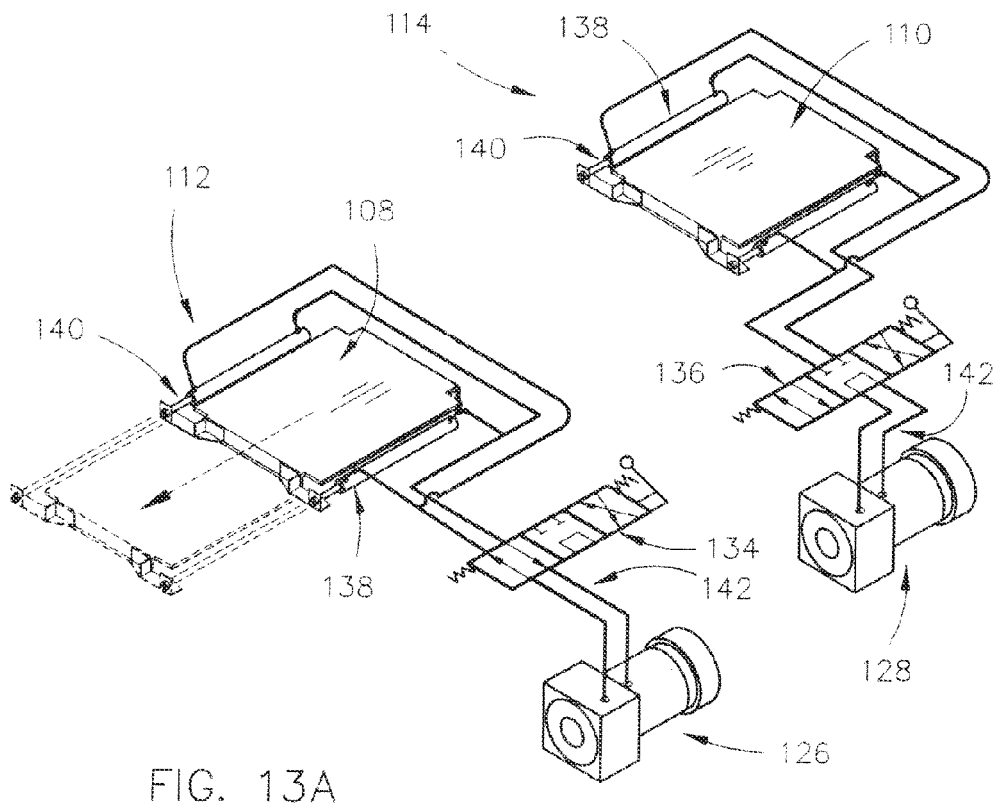
FIGS. 13A through 13D are schematics illustrating a first door assembly coupled with a first hydraulic assembly, a second door assembly coupled with a second hydraulic assembly, a first motor driven hydraulic pump for actuating the first hydraulic assembly for opening and closing the first door assembly, a second motor driven hydraulic pump for actuating the second hydraulic assembly for opening and closing the second door assembly, a first selector valve for selectively operating the first hydraulic assembly for opening and closing the first door assembly utilizing the first hydraulic pump, and a second selector valve for selectively operating the second hydraulic assembly for opening and closing the second door assembly utilizing the second hydraulic pump.
Figure 13B:
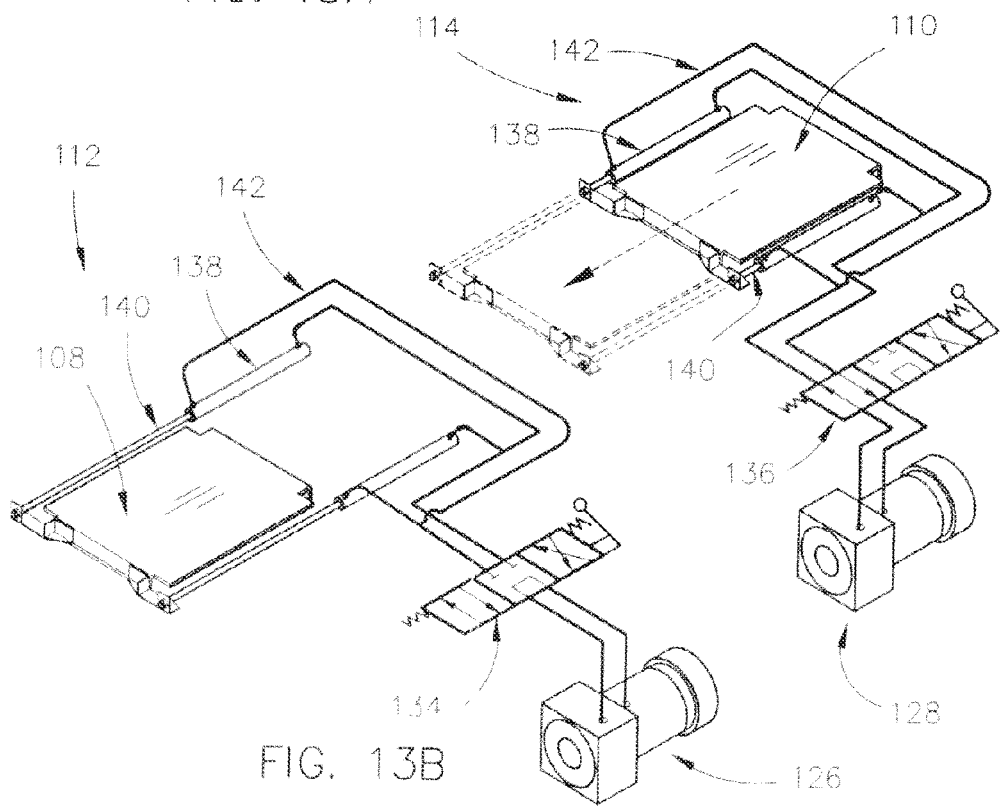
Figure 13C:
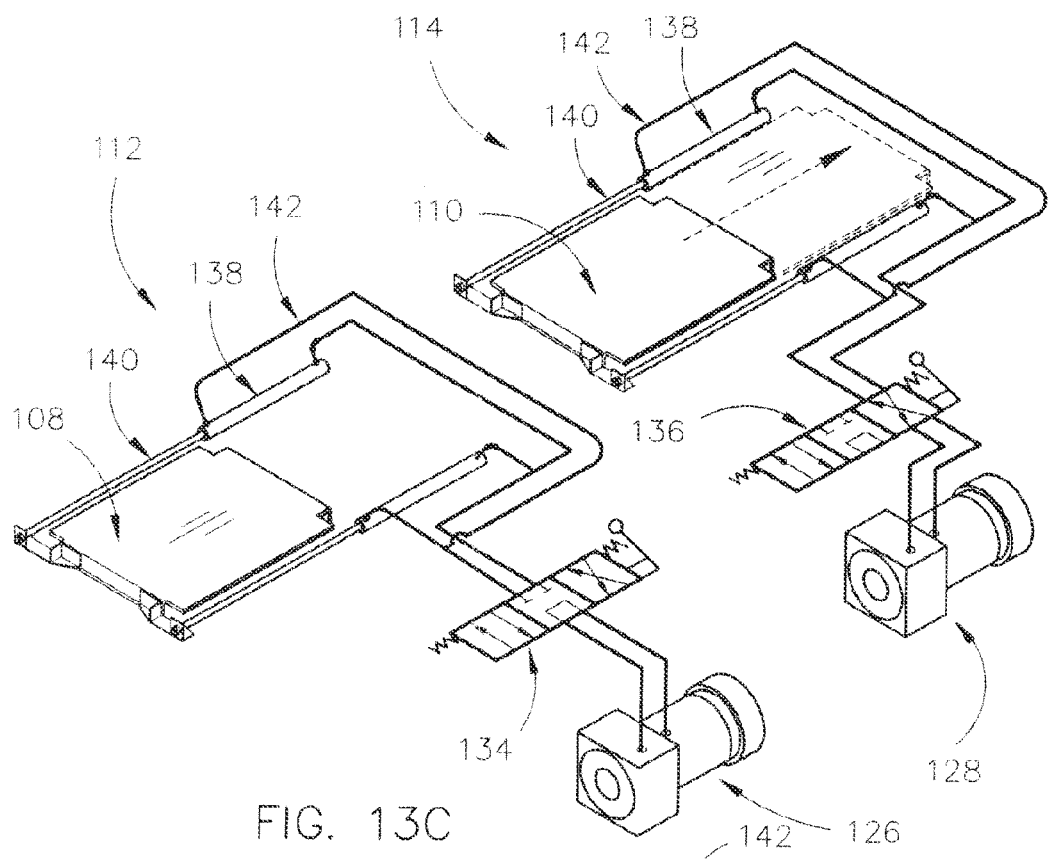
Figure 13D:
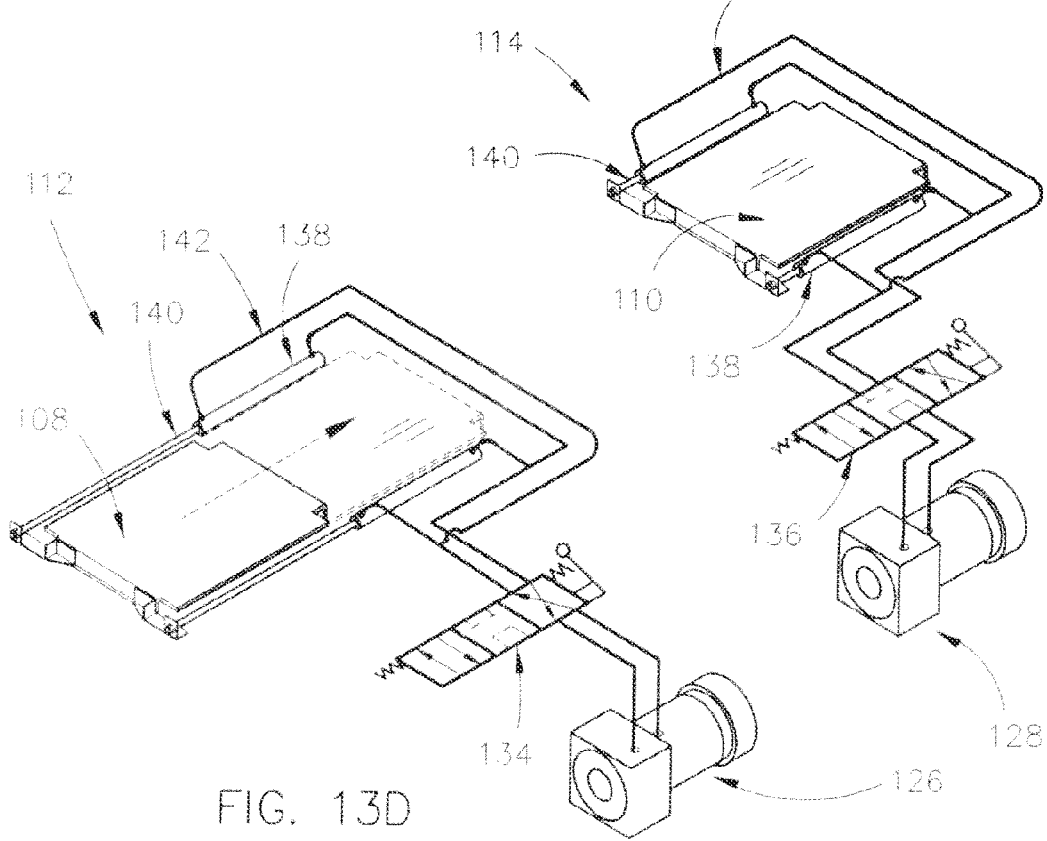

Referring to FIGS. 8 through 13, pump assembly 116, pump assembly 120, pump assembly 122, pump assembly 124, pump assembly 126, and pump assembly 128 are depicted. The device 100 may utilize a single pump assembly configuration to operate/actuate each hydraulic assembly coupled to transport assembly 102 via the use of one or more selector valves/hydraulic direction-control valves (e.g., selector valve 118, selector valve 130, and/or selector valve 132). The device 100 may also utilize multiple pump assemblies to operate multiple hydraulic assemblies coupled to the transport assembly 102. For example, the device 100 may include a pump assembly for each hydraulic assembly (e.g., as illustrated in FIGS. 9, 11, and 13).

The device 100 may have a single pump assembly configuration (pump assembly 116 and pump assembly 124) coupled to both the first hydraulic assembly 112 and the second hydraulic assembly 114 as illustrated in FIGS. 8, 10, 12. The operator may engage the selector valve(s) (selector valve 118, selector valve 130, and selector valve 132) to control which hydraulic assembly will be actuated/activated. The selector valve(s) may be engaged manually or electronically. The selector valve(s) may be connected between the pump assembly and the first hydraulic assembly 112 and between the pump assembly and the second hydraulic assembly 114. When a selector valve is engaged, the selector valve may allow the pump assembly 116 to pump hydraulic fluid only to the selected hydraulic assembly (e.g., hydraulic assembly 112 or hydraulic assembly 114), which may allow the operator to select and operate a door assembly (e.g., door assembly 108 or door assembly 110) coupled to the selected hydraulic assembly. In embodiments, one or more selector valves may be implemented as hydraulic poppet valves 198 for controlling the opening and/or closing of the door assemblies. For example, a poppet valve may be implemented as a two-way solenoid utilized to block hydraulic fluid from entering and/or exiting a rod end of a hydraulic cylinder until the coils of a motor driven pump assembly are energized for pumping the hydraulic fluid. Further, the poppet valves may be electrically operated, and may include a manual override function in case of a solenoid failure, or the like.

The device 100 may have a double pump assembly configuration as depicted in FIGS. 9, 11, and 13. For example, pump assembly 120 and pump assembly 122 may be coupled to the first hydraulic assembly 112 and the second hydraulic assembly 114 via hoses 142. Alternatively, pump assembly 126 and pump assembly 128 may be coupled to the first hydraulic assembly 112 and the second hydraulic assembly 114.

The device 100 may include a variety of pump assemblies capable of actuating the first hydraulic assembly 112 and hydraulic assembly 114. For example, pump assembly 116, pump assembly 120, and/or pump assembly 122 may be actuated via a crank assembly. In embodiments, the crank assembly may be a hand crank capable of being operated by hand. In one specific embodiment, the hand crank assembly may be a 2.4 cubic inch displacement axial piston pump. The 2.4 cubic inch displacement axial piston pump may include a built-in lock valve for preventing trap door feedback or pressure to the hand crank when the granular material is unloaded. The 2.4 cubic inch displacement axial piston pump may produce approximately 1000 pounds per square inch (psi) of hydraulic pressure at 42-foot pounds of torque. It will be appreciated that other types of hand operable pumping devices may be utilized with the present invention, including other types of hand crank assemblies.

Alternatively, pump assembly 116, pump assembly 120, and pump assembly 122 may be actuated via a motor assembly. In some embodiments, the motor assembly may be a 12 Volt Direct Current (DC) bi-rotational hydraulic power unit. For example, the pump may be rotated in reverse to change whether a piston rod is extended or retracted. The electric hydraulic bi-rotational pump may include two pressure relief valves, as well as internal check valves. In embodiments, the pump may be dust tight, and may include a power shaft in case of loss of power. An electric drill may be utilized to power the pump in this case. The motor assembly may be controlled via a remote actuator 160 (e.g. a remote control, a radio remote control, or the like). Referring generally to FIGS. 12 through 13, pump assembly 124, pump assembly 126, and/or pump assembly 128 may be a gear pump assembly. The gear pump assembly may be a 12 Volt Direct Current (DC) gear pump. It should be noted that this particular implementation is provided by way of example only, and other types of motor assemblies may be utilized for driving various pump assemblies.

Referring generally to FIGS. 12A through 12D, an embodiment of a gear pump assembly configuration is depicted. The device 100 may utilize two or more selector valves: e.g., the first selector valve 130 and the second selector valve 132, to control the directional flow of the hydraulic fluid to a single hydraulic assembly. More specifically, the device 100 may utilize a first selector valve 130 to control the directional flow of hydraulic fluid to the first hydraulic assembly 112. The device 100 may also utilize a second selector valve 132 to control the directional flow of hydraulic fluid to the second hydraulic assembly 114. It will be appreciated that the pump assembly 124 may be controlled via a remote actuator 160. The first selector valve 130 and the second selector valve 132 may be manually or electrically switched or engaged.

Referring generally to FIGS. 13A through 13D, an alternative embodiment of the gear pump assembly configuration is depicted. The device 100 may utilize a first selector valve 134 to control the directional flow of hydraulic fluid to the first hydraulic assembly 112. The device 100 may utilize a second selector valve 136 to control the directional flow of hydraulic fluid to the second hydraulic assembly 114. It will be appreciated that the first pump assembly 126 and the second pump assembly 128 may be controlled via a remote actuator 160 (not shown in FIGS. 13A through 13D), such as a remote control, a radio remote control, and the like. The first selector valve 134 and the second selector valve 136 may be manually or electrically switched or engaged. It will be appreciated that while the examples in FIGS. 8A through 13D depict particular types of selector valves 118, 130, and/or 132, the illustrated selector valves are provided by way of example only, and are not meant to be restrictive of the present disclosure. Thus, other types of selector valves may be utilized with hydraulic circuits of the present disclosure and included with (but not limited to) the embodiments illustrated in FIGS. 8A through 13D, such as the hydraulic poppet valves 198 illustrated in FIGS. 19 and 20, or other types of selector valves.

Figure 14:
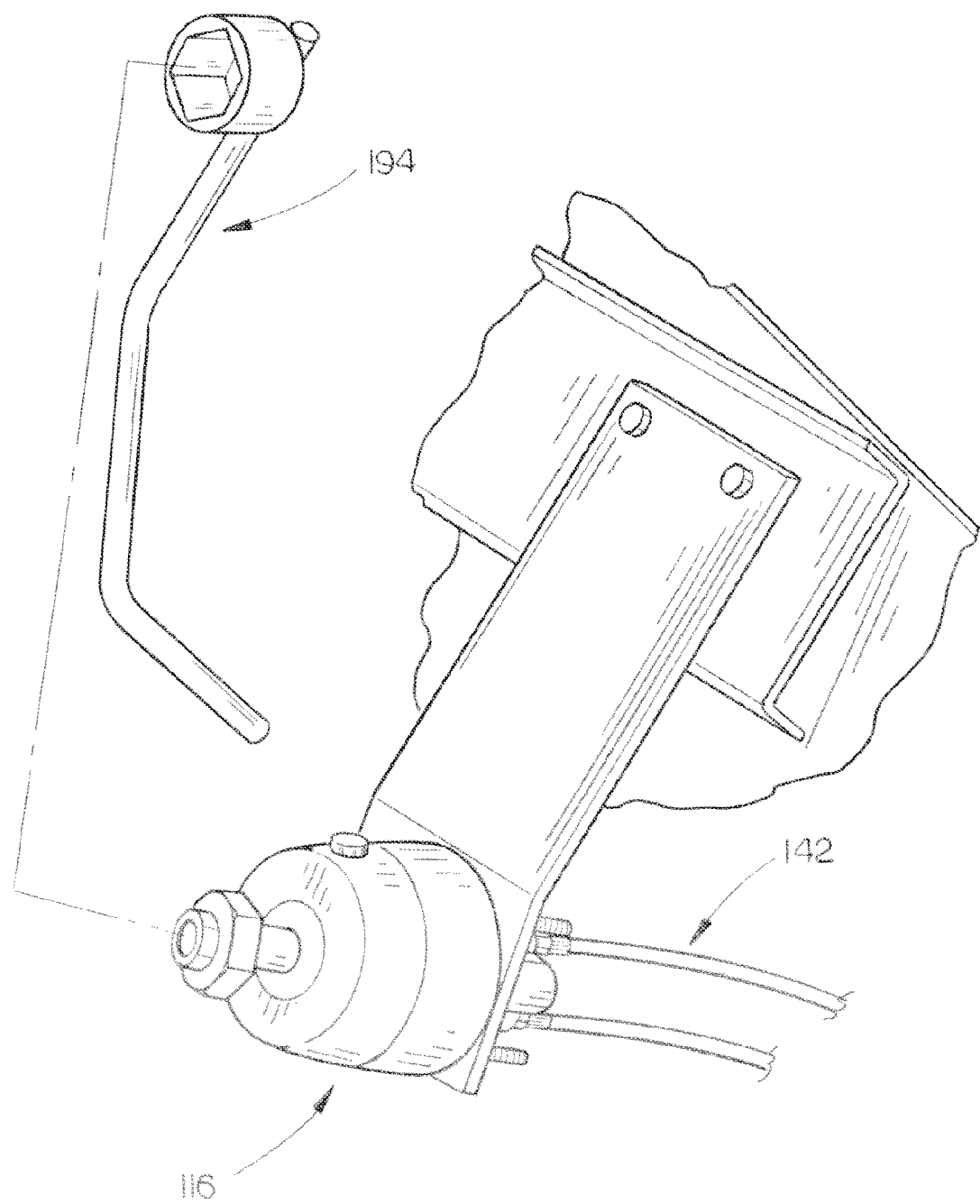
FIG. 14 is a perspective view of a hydraulic pump assembly and a removable hand crank for actuating the hydraulic pump assembly.

Generally referring to FIG. 14, a pump assembly, such as the pump assembly 116, may be actuated via a manual actuator configured to receive a ratchet 194, an electrically powered hand drill chuck, or the like. The pump assembly 116 may be connected to, for example, the first hydraulic system 112 via hoses 142. In the embodiment illustrated in FIG. 14, the pump assembly 116 may also be connected to, for example, the second hydraulic system 114 via hoses 142. In embodiments, the operator may engage, or select, the hydraulic system the operator wants to control via the selector valve 118.

Figure 15:
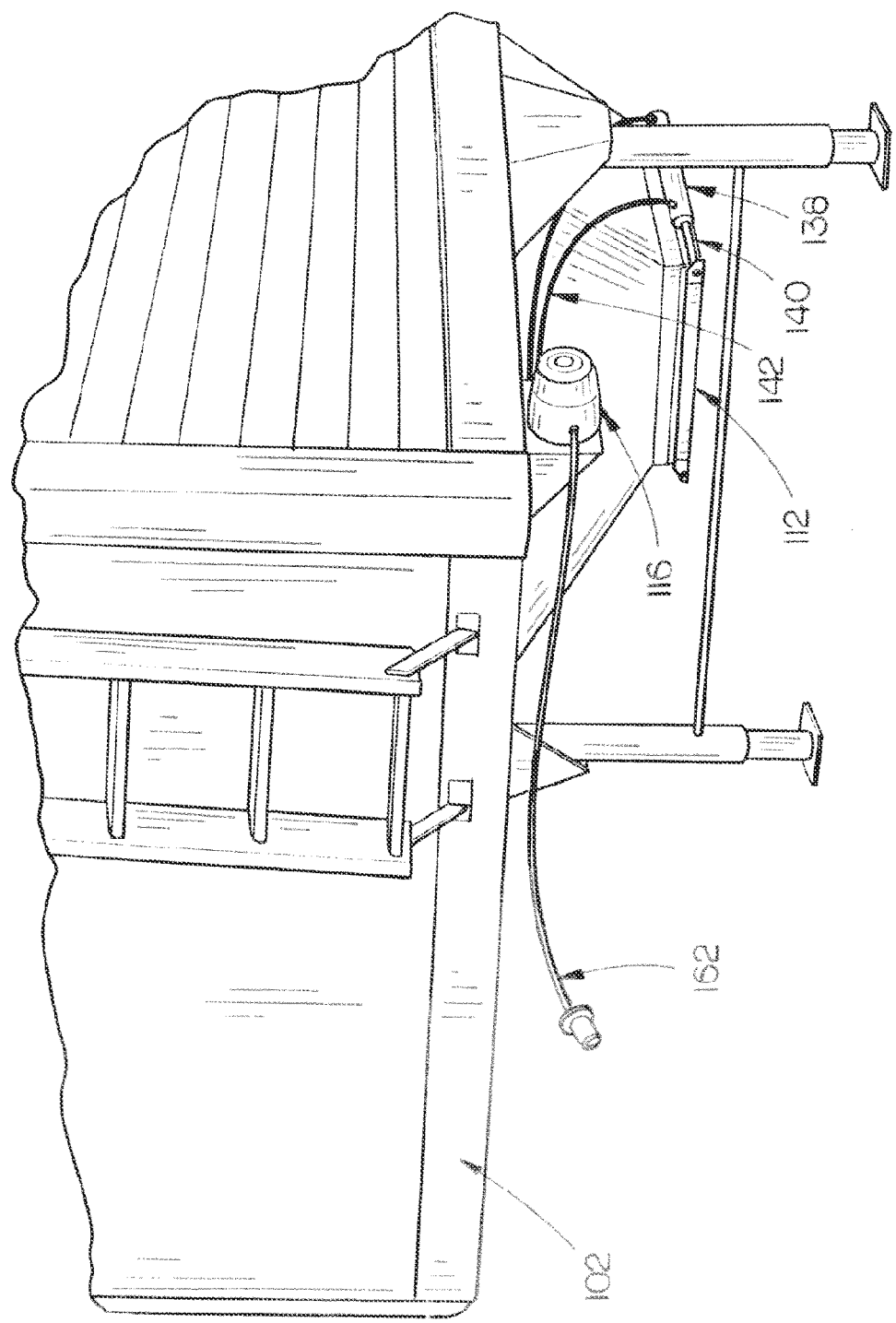
FIG. 15 is a partial perspective view of a transport assembly and a pump assembly for operating a door assembly, where the pump assembly includes a power cord for connecting to a towing engine.

Referring generally to FIG. 15, the pump assembly 116 may be powered by a towing engine (not shown), such as a semi tractor or the like. The pump assembly 116 may be operatively coupled to the towing engine via a power cord 162, or the like. While FIG. 15 depicts only pump assembly 116 as powered by a towing engine, it is understood that a towing engine may be operatively connected to multiple pump assemblies utilizing one or more power cords. Further, one or more pump assemblies may be powered in other various ways. For instance, in another specific implementation, a pump assembly 116 may be connected to a lighting system of the transport assembly 102, or the like.

Figure 16:
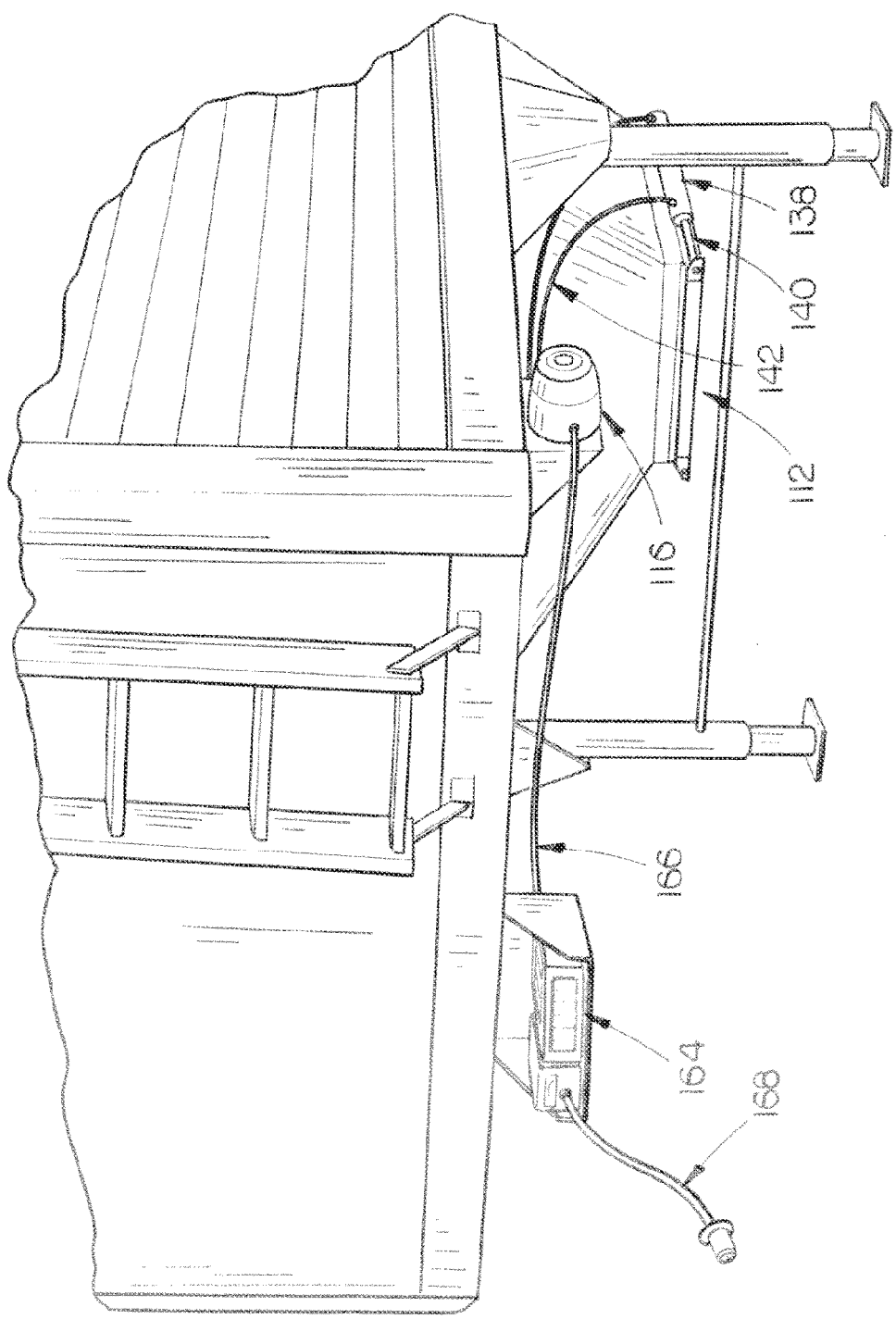
FIG. 16 is a partial perspective view of a transport assembly and a pump assembly for operating a door assembly, where the pump assembly includes a power cord for connecting to a battery, which may be charged utilizing a towing engine.

Referring generally to FIG. 16, another embodiment is depicted. The pump assembly 116 may be powered by a battery 164 residing on the transport assembly 102. The pump assembly 116 may be operatively connected to the battery 164 via a first power cord 166. The battery 164 may be charged from a power source residing on the towing engine (not shown). The battery 164 may be operatively connected to a power source residing on the engine via a second power cord 168. While FIG. 16 depicts only pump assembly 116 being operatively connected to the battery 164, it is understood that battery 164 may be operatively connected to multiple pump assemblies. Further, more than one battery may be utilized.

Figure 17:
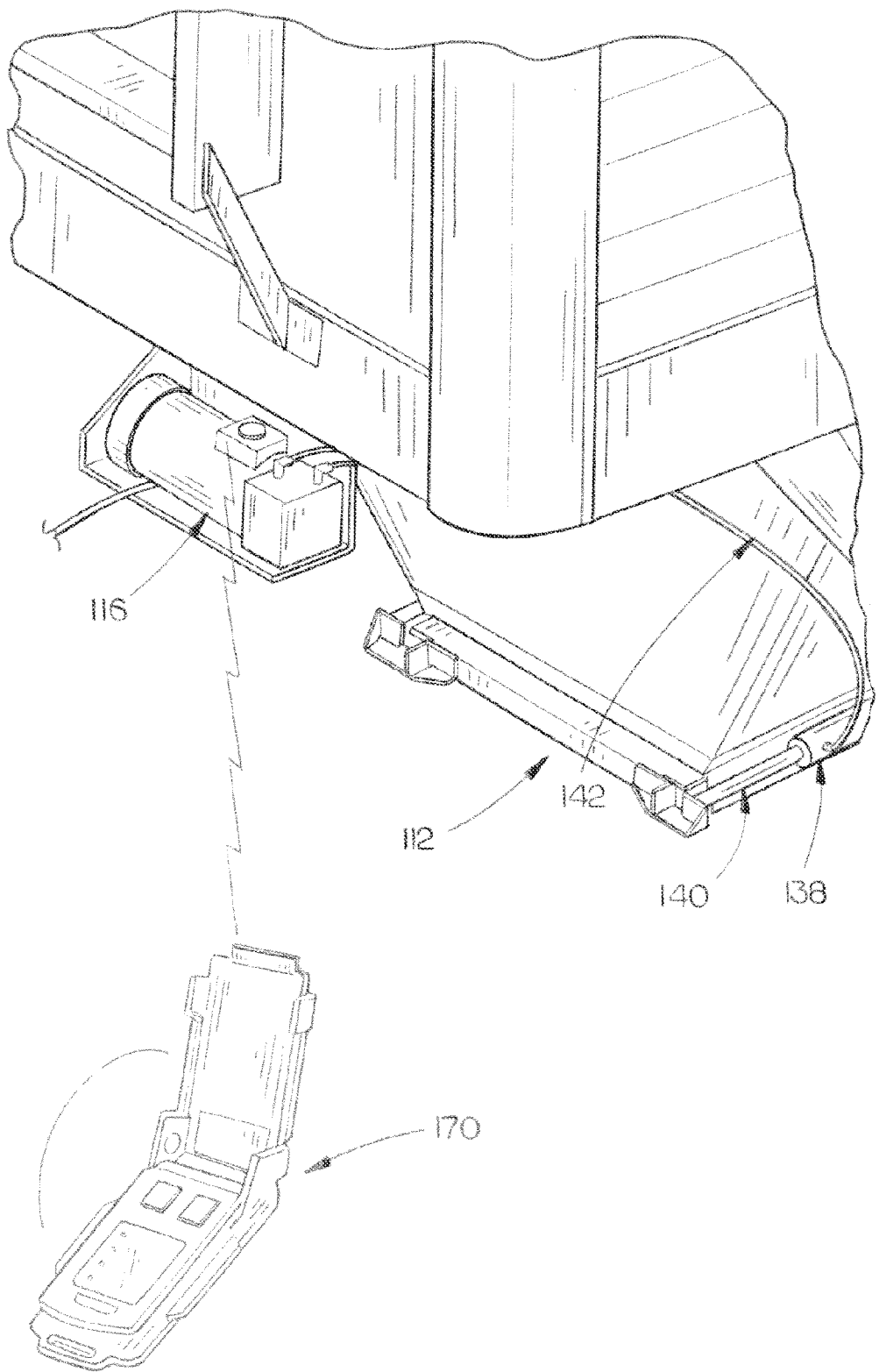
FIG. 17 is a partial perspective view of a transport assembly and a pump assembly for operating a door assembly, where the pump assembly may be remotely controllable by a mobile electronic device.

Referring generally to FIG. 17, the pump assembly 116 may be controlled via a mobile device 170, such as a cellular phone, a mobile electronic device, a personal digital assistant, or the like. In embodiments, the pump assembly 116 may be controlled utilizing a remote control transmitter. For instance, in one specific implementation, a radio control transmitter may be utilized with a time delay on of two seconds, a push button to enable after 20 seconds, and/or a time to automatic shutoff of five minutes. However, other types of mobile/remote controls may be utilized as well. In some embodiments, a remote control transmitter may be provided in the form of a pendant, or the like.

In embodiments, the pump assembly 116 may be connected to an electric control box 200, or the like, for actuating/activating the pump assembly 116. In embodiments, the electric control box 200 may be connected between the pump assembly 116 and the battery 164, or alternatively, between the pump assembly 116 and the towing engine (e.g., when the towing engine is utilized to power the pump assembly 116). In some embodiments, the electric control box may include a key switch, which may be activated via a removable key or the like, for selectively supplying power to the pump assembly 116. The electric control box 200 may be constructed to be at least substantially weatherproof. For example, it may be able to withstand water jets, dust, as well as being splash resistant to oil, gasoline, antifreeze, cleaning solutions, and/or brake fluid. Further, the electric control box 200 may include strain relief connectors or other suitable hardware for minimizing the stress induced via tension on cables connected to the electric control box.

Figure 18:
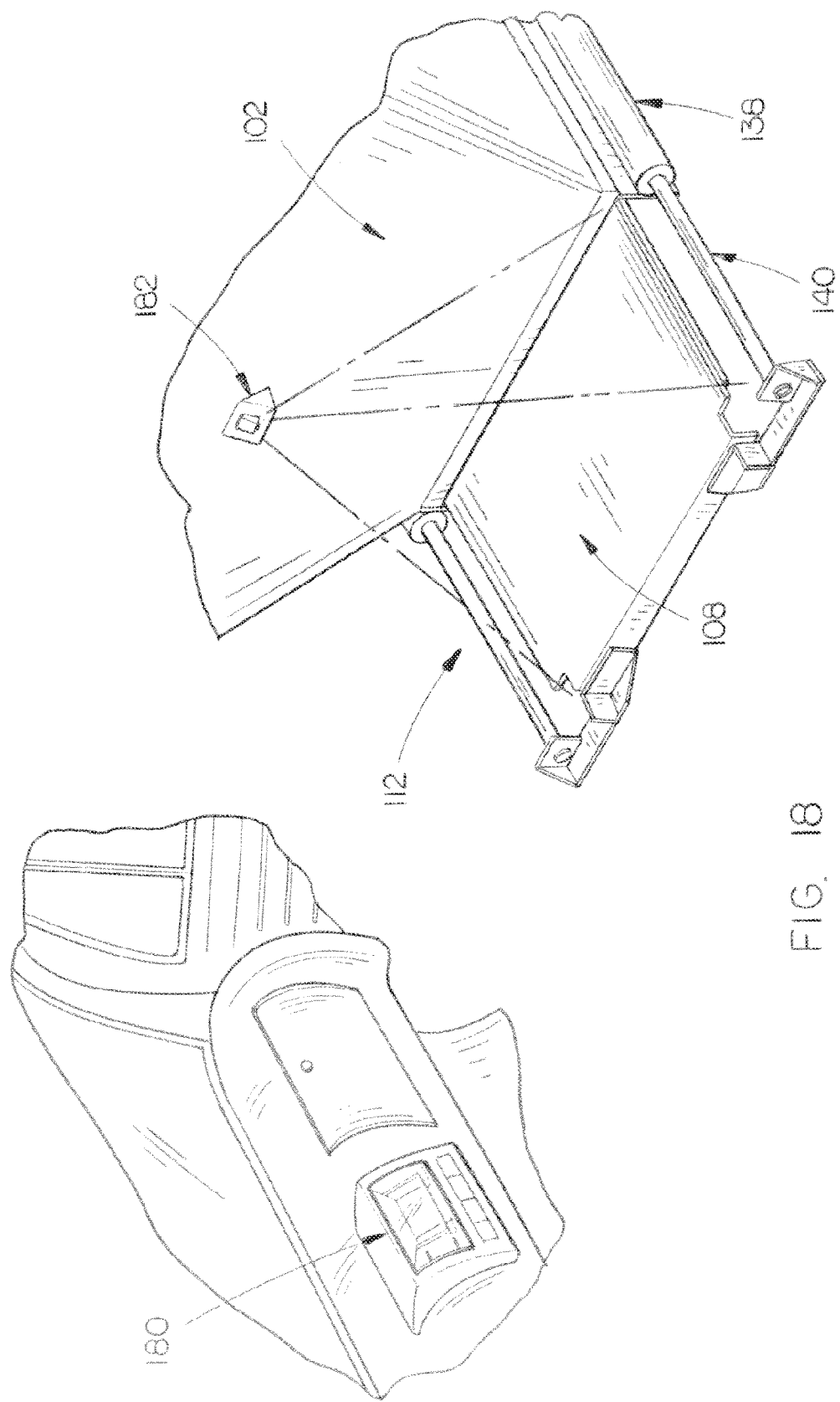
FIG. 18 is a partial perspective view of a transport assembly and a door assembly, where the transport device includes an image capture device for allowing an operator to monitor the position of the door assembly.
Figure 19:
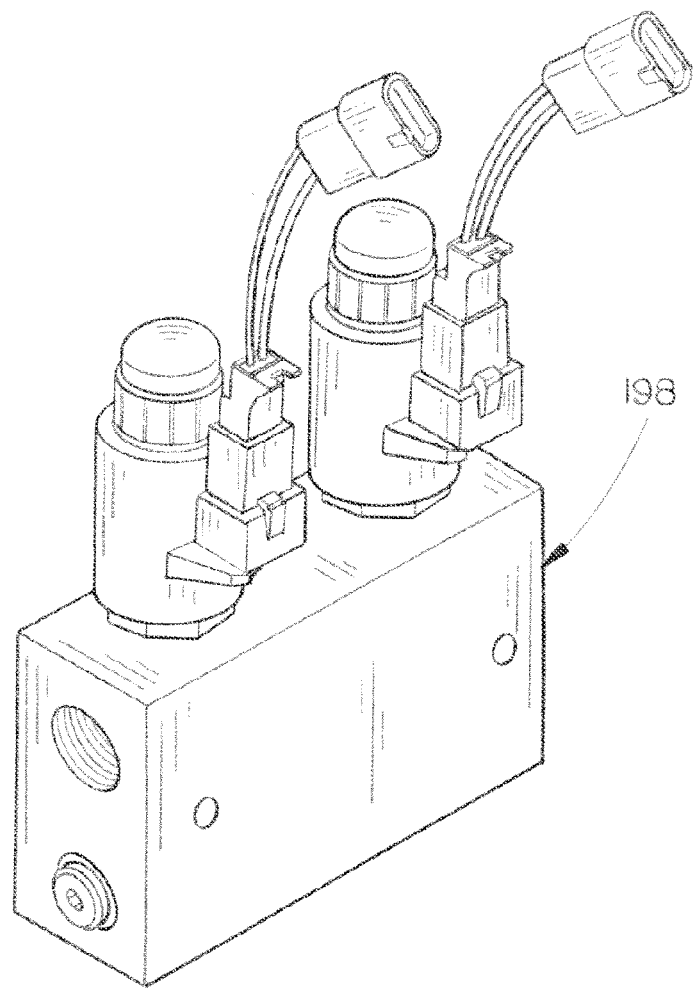
FIG. 19 is an isometric view of a hydraulic poppet valve assembly.
Figure 20:
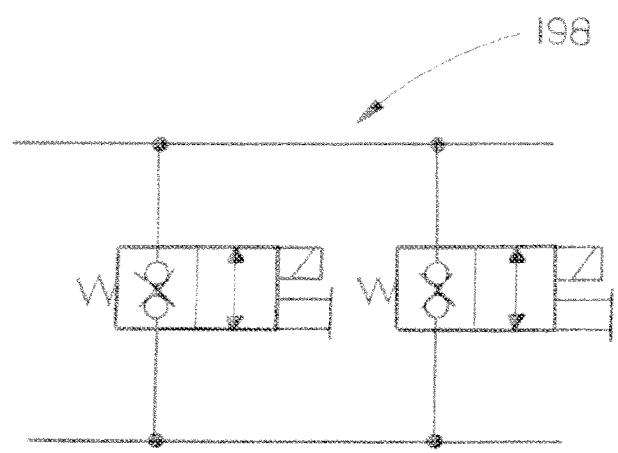
FIG. 20 is a schematic of a hydraulic poppet valve assembly.
Figure 21:
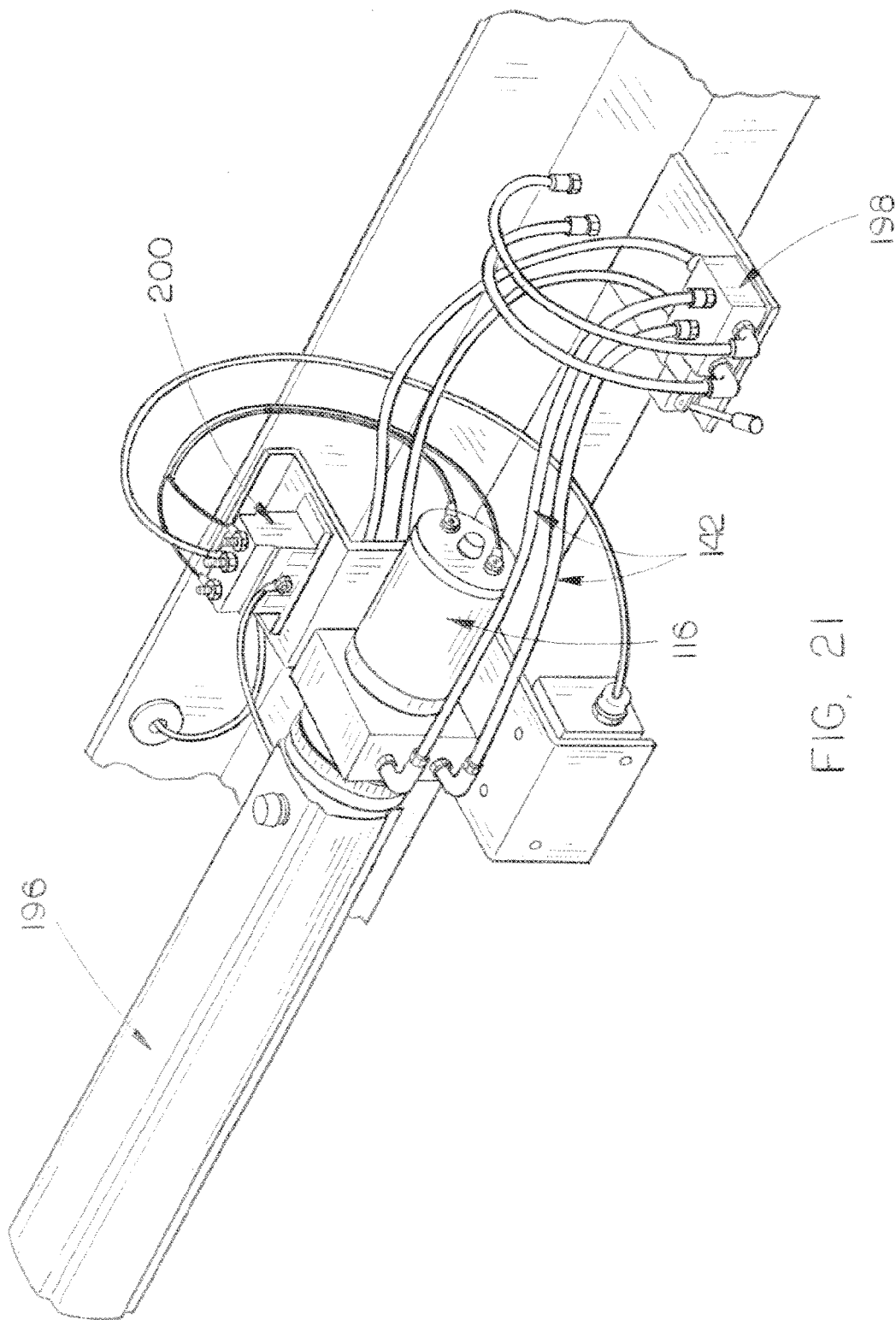
FIG. 21 is a partial isometric view of a device including a pump assembly for operating a door assembly, a hydraulic reservoir, a control box, and a hydraulic poppet valve assembly.
Figure 22:
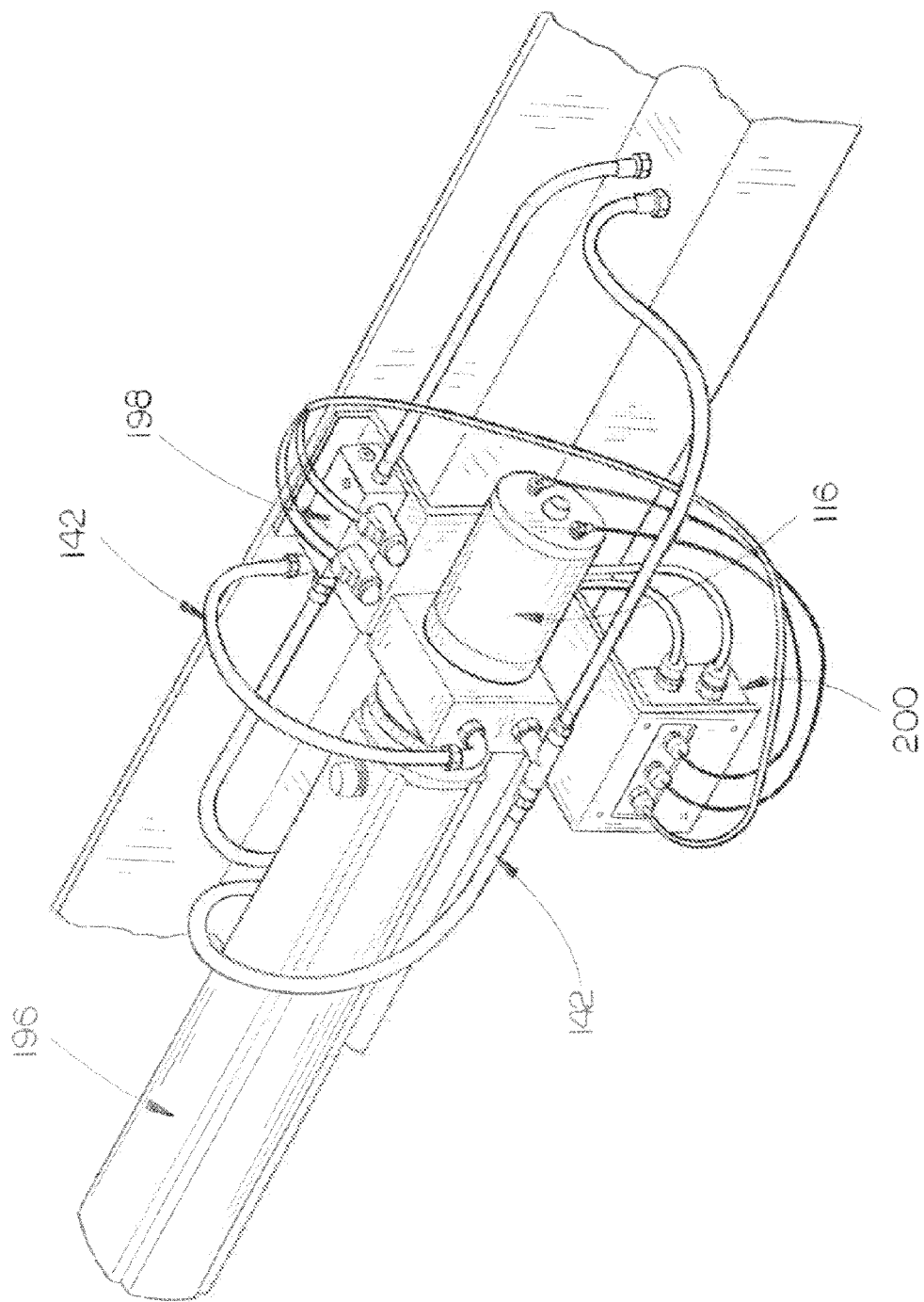
FIG. 22 is another partial isometric view of a device including a pump assembly for operating a door assembly, a hydraulic reservoir, a control box, and a hydraulic poppet valve assembly.
Figure 23:
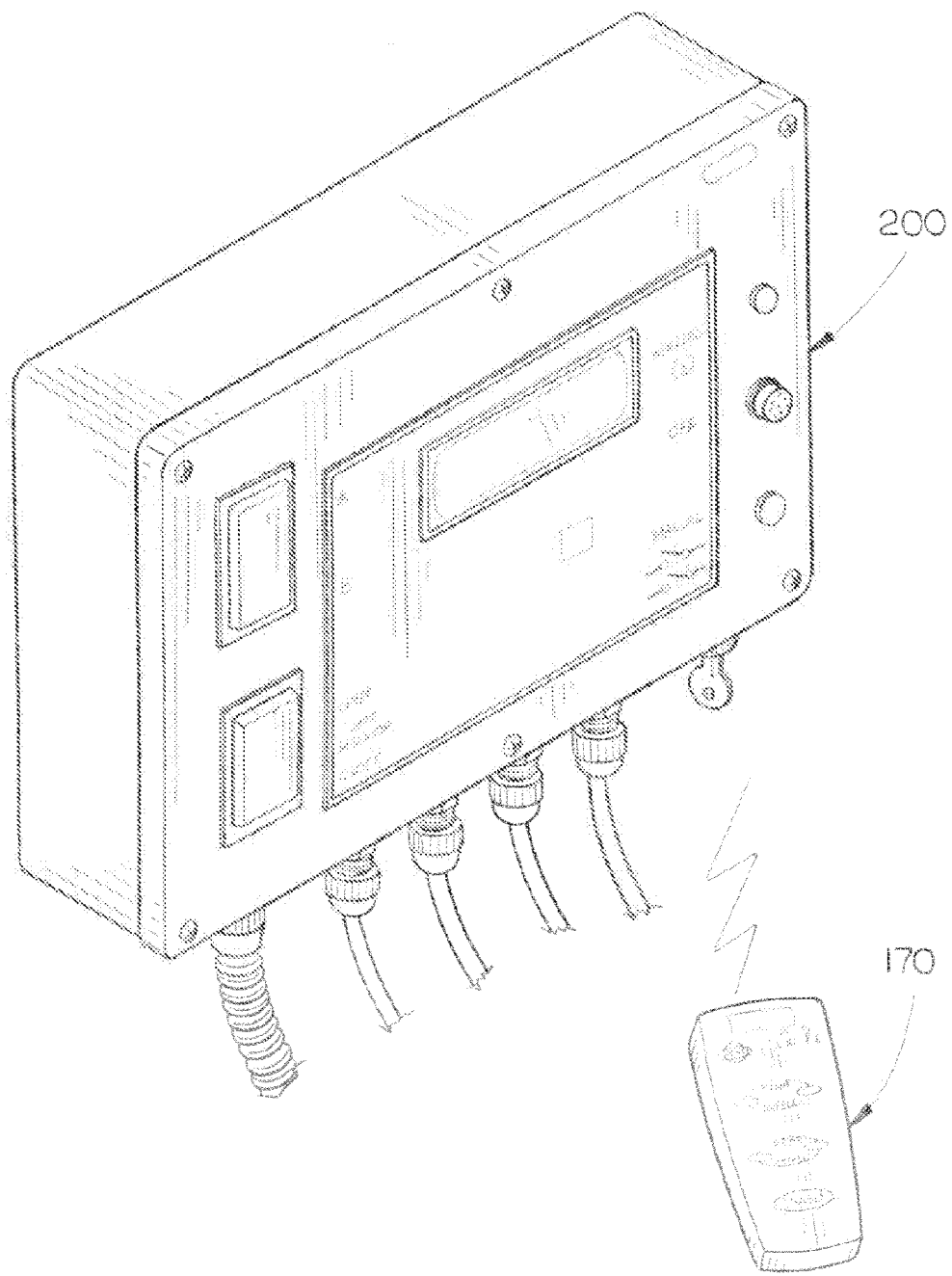
FIG. 23 is an isometric view of a control box for selectively activating the motor of a pump assembly, and a remote actuator for remotely controlling the pump assembly.

Referring generally to FIG. 18, the transport assembly 102 may include a recording device/image capture device 182, such as a camera or the like, positioned over the first hydraulic system 112 to indicate to the operator of the towing engine where the first hydraulic system 112 is positioned in relation to the granular material release point. The operator may view images taken by the recording device 182 via a visual display unit 180 located in the cab of the towing vehicle. The viewing screen 180 may be a liquid crystal display or the like.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A device, comprising:
a transport assembly for transporting granular material, the transport assembly defining at least a first egress and a second egress, the first egress for releasing a first portion of the granular material, and the second egress for releasing a second portion of the granular material;
a first door assembly slidably coupled with the transport assembly, the first door assembly including a first single door panel configured for at least substantially covering the first egress in a first position for retaining granular material and at least substantially uncovering the first egress in a second position for controllably releasing the first portion of the granular material;
a second door assembly slidably coupled with the transport assembly, the second door assembly including a second single door panel configured for at least substantially covering the second egress in a third position for retaining granular material and at least substantially uncovering the second egress in a fourth position for controllably releasing the second portion of the granular material;
a first linear actuator assembly coupled with the transport assembly and the first door assembly, wherein the first linear actuator assembly is configured to extend or retract in a plane substantially parallel to a plane of the first door assembly for moving the first door assembly between the first position and the second position;
a second linear actuator assembly coupled with the transport assembly and the second door assembly, wherein the second linear actuator assembly is configured to extend or retract in a plane substantially parallel to a plane of the second door assembly for moving the second door assembly between the third position and the fourth position;
a pump assembly coupled with the first linear actuator assembly and the second linear actuator assembly, the pump assembly for actuating the first linear actuator assembly to move the first door assembly between the first position and the second position, and for actuating the second linear actuator assembly to move the second door assembly between the third position and the fourth position; and
a selector valve connected between the pump assembly and the first linear actuator assembly and between the pump assembly and the second linear actuator assembly for selecting at least one of the first linear actuator assembly or the second linear actuator assembly and controlling the movement of at least one of the first door assembly or the second door assembly, wherein the first door assembly, the second door assembly, the first linear actuator assembly, and the second linear actuator assembly are above a plane formed by axles of wheels of the transport assembly.

2. The device of 1, wherein at least one of the first linear actuator assembly or the second linear actuator assembly comprises a plurality of hydraulic cylinders.

3. The device of 1, wherein the pump assembly comprises a crank assembly for driving the pump assembly and actuating at least one of the first linear actuator assembly to move the first door assembly between the first position and the second position or for actuating the second linear actuator assembly to move the second door assembly between the third position and the fourth position.

4. The device of 3, wherein the crank assembly is configured for operation by hand.

5. The device of 3, wherein the crank assembly is configured for operation via an electrically powered hand drill.

6. The device of 1, wherein the pump assembly comprises a motor assembly for driving the pump assembly and actuating at least one of the first linear actuator assembly to move the first door assembly between the first position or the second position or for actuating the second linear actuator assembly to move the second door assembly between the third position and the fourth position.

7. The device of 6, wherein the motor assembly is remotely controllable.

8. The device of claim 1, wherein at least one of the first linear actuator assembly or the second linear actuator assembly is configured such that a piston rod coupled with at least one of the first door assembly or the second door assembly is retracted when the at least one of the first door assembly or the second door assembly is in the first position for retaining the granular material.

9. The device of claim 1, further comprising: at least one tube for connecting at least one of the first linear actuator assembly to the pump assembly or the second linear actuator assembly to the pump assembly; and an A-frame structure for at least partially covering the at least one tube.

10. A device, comprising:
a transport assembly for transporting granular material, the transport assembly defining at least a first egress for releasing a first portion of the granular material;
a door assembly slidably coupled with the transport assembly, the door assembly including a single door panel configured for at least substantially covering the first egress in a first position for retaining granular material and at least substantially uncovering the first egress in a second position for controllably releasing the first portion of the granular material;
a linear actuator assembly coupled with the transport assembly and the door assembly, wherein the linear actuator assembly is configured to extend or retract in a plane substantially parallel to a plane of the door assembly for moving the door assembly between the first position and the second position; and
a pump assembly coupled with the linear actuator assembly for actuating the linear actuator assembly to move the door assembly between the first position and the second position, wherein the door assembly and the linear actuator assembly are above a plane formed by axles of wheels of the transport assembly.

11. The device of 10, wherein the linear actuator assembly comprises a plurality of hydraulic cylinders.

12. The device of 10, wherein the pump assembly comprises a crank assembly for driving the pump assembly and actuating the linear actuator assembly to move the door assembly between the first position and the second position.

13. The device of 12, wherein the crank assembly is configured for operation by hand.

14. The device of 12, wherein the crank assembly is configured for operation via an electrically powered hand drill.

15. The device of 10, wherein the pump assembly comprises a motor assembly for driving the pump assembly and actuating the linear actuator assembly to move the door assembly between the first position and the second position.

16. The device of 15, wherein the motor assembly is remotely controllable.

17. The device of claim 10, further comprising: at least one tube for connecting the linear actuator assembly to the pump assembly, and an A-frame structure for at least partially covering the at least one tube.

18. A device, comprising:
a transport assembly for transporting granular material, the transport assembly defining at least a first egress and a second egress, the first egress for releasing a first portion of the granular material, and the second egress for releasing a second portion of the granular material;
a first door assembly slidably coupled with the transport assembly, the first door assembly including a first single door panel configured for at least substantially covering the first egress in a first position for retaining granular material and at least substantially uncovering the first egress in a second position for controllably releasing the first portion of the granular material;
a second door assembly slidably coupled with the transport assembly, the second door assembly including a second single door panel configured for at least substantially covering the second egress in a third position for retaining granular material and at least substantially uncovering the second egress in a fourth position for controllably releasing the second portion of the granular material;
a first linear actuator assembly coupled with the transport assembly and the first door assembly, wherein the first linear actuator assembly is configured to retract or contract in a plane substantially parallel to a plane of the first door assembly for moving the first door assembly between the first position and the second position;
a second linear actuator assembly coupled with the transport assembly and the second door assembly, wherein the second linear actuator assembly is configured to extend or retract in a plane substantially parallel to a plane of the second door assembly for moving the second door assembly between the third position and the fourth position;
a pump assembly coupled with the first linear actuator assembly and the second linear actuator assembly, the pump assembly for actuating the first linear actuator assembly to move the first door assembly between the first position and the second position, and for actuating the second linear actuator assembly to move the second door assembly between the third position and the fourth position;
a first selector valve connected between the pump assembly and the first linear actuator assembly for controlling the movement of the first door assembly; and a second selector valve connected between the pump assembly and the second linear actuator assembly for controlling the movement of the second door assembly, wherein the first door assembly, the second door assembly, the first linear actuator assembly, and the second linear actuator assembly are above a plane formed by axles of wheels of the transport assembly.

19. The device of 18, wherein at least one of the first linear actuator assembly or the second linear actuator assembly comprises a plurality of hydraulic cylinders.

20. The device of 18, wherein the pump assembly is remotely controllable.

21. A device, comprising:

a transport assembly for transporting granular material, the transport assembly defining at least a first egress for releasing a first portion of the granular material;

a door assembly slidably coupled with the transport assembly, the door assembly including a single door panel configured for at least substantially covering the first egress in a first position for retaining granular material and at least substantially uncovering the first egress in a second position for controllably releasing the first portion of the granular material;

a linear actuator assembly coupled with the transport assembly and the door assembly, wherein the linear actuator assembly is configured to extend or retract in a plane substantially parallel to a plane of the door assembly for moving the door assembly between the first position and the second position;

a pump assembly coupled with the linear actuator assembly for actuating the linear actuator assembly to move the door assembly between the first position and the second position; and a selector valve connected between the pump assembly and the linear actuator assembly for controlling the movement of the door assembly, wherein the door assembly and the linear actuator assembly are above a plane formed by axles of wheels of the transport assembly.

22. The device of 21, wherein the linear actuator assembly comprises a plurality of hydraulic cylinders.

23. The device of 21, wherein the pump assembly is remotely controllable.

* * * * *